(12) United States Patent
Wang

(10) Patent No.: US 11,681,774 B1
(45) Date of Patent: Jun. 20, 2023

(54) CLASSICALLY-BOOSTED QUANTUM OPTIMIZATION

(71) Applicant: Zapata Computing, Inc., Boston, MA (US)

(72) Inventor: Guoming Wang, North York (CA)

(73) Assignee: Zapata Computing, Inc., Boston, MA (US)

(*) Notice: Subject to any disclaimer, the term of this patent is extended or adjusted under 35 U.S.C. 154(b) by 0 days.

(21) Appl. No.: 17/702,244

(22) Filed: Mar. 23, 2022

Related U.S. Application Data

(60) Provisional application No. 63/164,954, filed on Mar. 23, 2021.

(51) Int. Cl.
  G06F 17/11 (2006.01)
  G06N 10/60 (2022.01)
  G06F 17/18 (2006.01)

(52) U.S. Cl.
  CPC .............. *G06F 17/11* (2013.01); *G06F 17/18* (2013.01); *G06N 10/60* (2022.01)

(58) Field of Classification Search
  CPC .......... G06F 17/11; G06F 17/18; G06N 10/60
  See application file for complete search history.

(56) References Cited

U.S. PATENT DOCUMENTS

| | | | |
|---|---|---|---|
| 7,590,607 | B2 | 9/2009 | Williams et al. |
| 7,877,333 | B2 | 1/2011 | Macready |
| 8,700,689 | B2 | 4/2014 | Macready et al. |
| 8,832,164 | B2 | 9/2014 | Allen et al. |
| 8,832,165 | B2 | 9/2014 | Allen et al. |
| 8,897,449 | B1 | 11/2014 | Broadbent |

(Continued)

FOREIGN PATENT DOCUMENTS

| CN | 106611377 A | 5/2017 |
|---|---|---|
| CN | 108062587 A | 5/2018 |

(Continued)

OTHER PUBLICATIONS

Wang, Guoming, "Classically-Boosted Quantum Optimization Algorithm", arXiv preprint arXiv:2203.13936, 2022 (Year: 2022).*

(Continued)

*Primary Examiner* — Matthew D Sandifer
(74) *Attorney, Agent, or Firm* — Blueshift IP, LLC; Robert Plotkin

(57) ABSTRACT

A method and system are provided for solving combinatorial optimization problems. A classical algorithm provides an approximate or "seed" solution which is then used by a quantum circuit to search its "neighborhood" for higher-quality feasible solutions. A continuous-time quantum walk (CTQW) is implemented on a weighted, undirected graph that connects the feasible solutions. An iterative optimizer tunes the quantum circuit parameters to maximize the probability of obtaining high-quality solutions from the final state. The ansatz circuit design ensures that only feasible solutions are obtained from the measurement. The disclosed method solves constrained problems without modifying their cost functions, confines the evolution of the quantum state to the feasible subspace, and does not rely on efficient indexing of the feasible solutions as some previous methods require.

28 Claims, 12 Drawing Sheets

(56) References Cited

U.S. PATENT DOCUMENTS

| | | | |
|---|---|---|---|
| 9,064,067 | B2 | 6/2015 | Wecker |
| 9,218,567 | B2 | 12/2015 | Macready et al. |
| 9,477,796 | B2 | 10/2016 | Garcia-Ramirez et al. |
| 9,836,432 | B2 | 12/2017 | Ronagh |
| 10,242,321 | B2 | 3/2019 | Bocharov et al. |
| 10,275,717 | B2 | 4/2019 | Babbush et al. |
| 10,325,218 | B1 | 6/2019 | Zeng et al. |
| 10,572,816 | B1 | 2/2020 | Vavilov et al. |
| 10,666,462 | B2 | 5/2020 | Shin et al. |
| 10,776,709 | B2 | 9/2020 | Shen et al. |
| 10,846,366 | B1 * | 11/2020 | Otterbach ............... G06F 17/17 |
| 10,990,677 | B2 | 4/2021 | Wiebe et al. |
| 11,010,682 | B2 | 5/2021 | Bocharov et al. |
| 11,244,240 | B2 | 2/2022 | Martinis et al. |
| 11,488,049 | B2 | 11/2022 | Cao et al. |
| 11,507,872 | B2 | 11/2022 | Cao et al. |
| 11,514,134 | B2 * | 11/2022 | Ronagh ................... G06F 17/11 |
| 2005/0167658 | A1 | 8/2005 | Williams et al. |
| 2011/0060710 | A1 * | 3/2011 | Amin ...................... G06F 15/16 |
| | | | 706/13 |
| 2014/0297247 | A1 | 10/2014 | Troyer et al. |
| 2017/0147303 | A1 | 5/2017 | Amy et al. |
| 2017/0255872 | A1 | 9/2017 | Hamze et al. |
| 2017/0364796 | A1 | 12/2017 | Wiebe et al. |
| 2018/0197102 | A1 | 7/2018 | Mohseni et al. |
| 2019/0019103 | A1 | 1/2019 | Dadashikelayeh |
| 2019/0164059 | A1 | 5/2019 | Denchev et al. |
| 2019/0164079 | A1 | 5/2019 | Gambetta et al. |
| 2019/0244680 | A1 | 8/2019 | Rolfe et al. |
| 2019/0318053 | A1 | 10/2019 | Low et al. |
| 2019/0378032 | A1 | 12/2019 | Kliuchnikov et al. |
| 2019/0394030 | A1 | 12/2019 | Forbes et al. |
| 2020/0057957 | A1 | 2/2020 | Johnson et al. |
| 2020/0104740 | A1 | 4/2020 | Cao |
| 2020/0118025 | A1 | 4/2020 | Romero et al. |
| 2020/0133947 | A1 * | 4/2020 | Wang ................... G06F 16/2453 |
| 2020/0184278 | A1 | 6/2020 | Zadeh et al. |
| 2020/0202249 | A1 | 6/2020 | Hastings |
| 2020/0226197 | A1 | 7/2020 | Woerner et al. |
| 2020/0257987 | A1 | 8/2020 | McGeoch et al. |
| 2020/0272683 | A1 * | 8/2020 | Ronagh ................... G06F 17/11 |
| 2020/0293936 | A1 | 9/2020 | Granade et al. |
| 2020/0320159 | A1 | 10/2020 | Matthews |
| 2020/0327440 | A1 | 10/2020 | Cao |
| 2020/0327441 | A1 | 10/2020 | Cao et al. |
| 2020/0334107 | A1 | 10/2020 | Katabarwa |
| 2020/0349459 | A1 | 11/2020 | Cao et al. |
| 2020/0372094 | A1 * | 11/2020 | Shehab ................... G06F 17/11 |
| 2020/0394547 | A1 | 12/2020 | Cao et al. |
| 2021/0011748 | A1 | 1/2021 | Lee et al. |
| 2021/0133618 | A1 | 5/2021 | Cao |
| 2021/0255856 | A1 | 8/2021 | Cao |
| 2022/0383177 | A1 | 12/2022 | Alcazar et al. |
| 2023/0023121 | A1 | 1/2023 | Cao |

FOREIGN PATENT DOCUMENTS

| | | |
|---|---|---|
| CN | 112789629 A | 5/2021 |
| EP | 3113084 A1 | 1/2017 |
| EP | 3837647 A1 | 6/2021 |
| EP | 4055533 | 9/2022 |
| WO | 2017066695 A1 | 4/2017 |
| WO | 2017152289 A1 | 9/2017 |
| WO | 2017156318 A1 | 9/2017 |
| WO | 2017189052 A1 | 11/2017 |
| WO | 2018064535 A1 | 4/2018 |
| WO | 2020037301 A1 | 2/2020 |
| WO | 2020072661 A1 | 4/2020 |
| WO | 2020142122 A2 | 7/2020 |
| WO | 2021092351 A1 | 5/2021 |
| WO | 2022173497 A2 | 8/2022 |
| WO | 2022173497 A9 | 9/2022 |
| WO | 2022204266 A1 | 9/2022 |
| WO | 2022271998 A1 | 12/2022 |

OTHER PUBLICATIONS

Notice of Allowance dated Aug. 12, 2022, in U.S. Appl. No. 16/844,051 of Yudong Cao, filed Apr. 9, 2020, 17 pages.

Notice of Allowance dated Aug. 26, 2022, for U.S. Appl. No. 16/864,998 of Yudong Cao, filed May 1, 2020, 48 pages.

Notice of Allowance dated Sep. 21, 2022, in U.S. Appl. No. 16/543,478 of Yudong Cao, filed Aug. 16, 2019, 43 pages.

International Search Report & Written Opinion dated Jun. 24, 2022, in international application No. PCT/US2022/021521, 8 pages.

Marsh, S., and Wang, J.B., "Combinatorial optimization via highly efficient quantum walks," Physical Review Research, vol. 2, No. 2 023302 (2020), pp. 1-8 (Jun. 8, 2020).

Non-Final Office Action dated Jun. 24, 2022, in U.S. Appl. No. 16/844,011 of Yudong Cao, filed Apr. 9, 2020, 46 pages.

Non-Final Office Action dated Jun. 29, 2022, in U.S. Appl. No. 16/844,051 of Yudong Cao, filed Apr. 9, 2020, 38 pages.

International Search Report & Written Opinion dated Jul. 30, 2020, in international patent application No. PCT/US2019/054795, 8 pages.

International Search Report and Written Opinion dated Dec. 4, 2019 in PCT Application No. PCT/US2019/046966, 8 pages.

International Search Report and Written Opinion dated Jan. 29, 2020, in International Patent Application No. PCT/US2019/054316, 8 pages.

Kandala, A., et al., "Hardware-efficient Variational Quantum Eigensolver for Small Molecules and Quantum Magnets," Nature 549, arXiv:1704. 05018v2, pp. 1-24 (2017).

Kothari, R., "Efficient algorithms in quantum query complexity", PhD thesis, University of Waterloo, pp. 1-128, 2014.

Lin, L, and Tong, Y., "Near-optimal ground state preparation," Quantum, 4:372,arXiv:2002.12508, pp. 1-22, (Dec. 6, 2020).

Matlab "Global Optimization Toolbox," The MathWorks, Inc., Copyright 1994-2021. 12 pages. Accessible at https://www.mathworks.com/products/global-optimization.html.

McArdle, S., et al., "Digital quantum simulation of molecular vibrations," Chemical science, 10(22):5725-5735, 2019. arXiv:1811. 04069, pp. 1-14 (Jan. 23, 2020).

McClean, J. R., et al., "Barren plateaus in quantum neural network training landscapes", Nature Communications, vol. 9, pp. 1-6, 2018.

McClean, J. R., et al., "The theory of variational hybrid quantum-classical algorithms", New Journal of Physics, vol. 18, pp. 1-22 (Feb. 5, 2016).

McClean, J.R., et al., "The theory of variational hybrid quantum-classical algorithms," New Journal of Physics, vol. 18, No. 2, arXiv:1509.04279, pp. 1-20 (Sep. 14, 2015).

Meir, Y., and Wingreen., "Landauer formula for the current through an interacting electron region," Physical review letters, vol. 68, No. 16, pp. 2512-2516, (Apr. 20, 1992).

Moll, N., et al., "Quantum optimization using variational algorithms on near-term quantum devices," Quantum Science and Technology, vol. 3, pp. 18 (Jun. 19, 2018) [retrieved on Nov. 25, 2019], Retrieved from <https://iopscience.iop.org/article/10.1088/2058-9565/aab822/pdf>.

Moll, N., et al., "Quantum optimization using variational algorithms on near-term quantum devices," Arxiv.org, Cornell University Library, 201 Olin Library Cornell University Ithaca, NY 14853, pp. 1-30 (Oct. 3, 2017), XP081147319, DOI: 10.1088/2058-9565/AAB822.

Moser, R.A., and Scheder, D., "A full derandomization of Schöning's k-SAT algorithm," Proceedings of the 43rd Annual ACM Symposium on Theory of Computing—STOC '11, pp. 245-251 (ACM Press, New York, New York, USA, 2011).

Nielsen, M. A., and Chuang, I. L., "Quantum Computation and Quantum Information", Cambridge University Press, pp. 1-704 (2000).

Nielsen, M., "The Fermionic canonical commutation relations and the Jordan-Wigner transform", michaelnielsen.org, pp. 1-8, 2005.

Non-Final Office Action dated Dec. 7, 2020, in U.S. Appl. No. 16/543,478 of Yudong Cao, filed Aug. 16, 2019, 33 pages.

Non-Final Office Action dated Sep. 3, 2021, in U.S. Appl. No. 16/543,478 of Yudong Cao, filed Aug. 16, 2019, 27 pages.

Notice of Allowance dated Jun. 9, 2021 for U.S. Appl. No. 17/272,189 of Yudong Cao, filed Feb. 26, 2021, 16 pages.

(56) References Cited

OTHER PUBLICATIONS

O'Malley, P. J. J., et al., "Scalable quantum simulation of molecular energies", Physical Review X, vol. 6, No. 3, pp. 031007-1-031007-13, (2016).
O'Brien, T. E., et al., "Calculating energy derivatives for quantum chemistry on a quantum computer," NPJ Quantum Information, vol. 5, No. 1, pp. 1-12 (2019).
Otterbach et al., U.S. Appl. No. 62/597,836 Specification, Provisional for U.S. Appl. No. 16/217,410, now U.S. Pat. No. 10,846,366, Dec. 2017. (Year: 2017).
Peruzzo, A., et al., "A variational eigenvalue solver on a photonic quantum processor", Nature Communications, vol. 5, Article No. 4213, pp. 1-7 (2014).
Preskill, J., "Quantum Computing in the NISQ era and beyond", arXiv preprint arXiv:1801.00862v3, pp. 1-20 (Jul. 31, 2018).
Rebentrost, P., et al., "Quantum support vector machine for big data classification", Physical Review Letters, arXiv: 1307.04713, vol. 113, No. 3, pp. 1-5 (Jul. 10, 2014).
Rice, J.E., et al., "Quantum Chemistry Simulation of dominant products in lithium-sulfur batteries," The Journal of Chemical Physics, 154(13):134115, 2021. arxiv2001.01120, pp. 1-7 (Jan. 4, 2020).
Romero, J., et al., "Strategies for quantum computing molecular energies using the unitary coupled cluster ansatz", arXiv:1701.02691 v2 [quant-ph], vol. 4, No. 4, pp. 1-18 (Feb. 10, 2018).
Schuch, N. and Verstraete, F., "Computational Complexity of interacting electrons and fundamental limitations of Density Functional Theory", Nature Physics, DOI: 10.1038/NPHYS1370, pp. 732-735 (Aug. 23, 2009).
Seeley, J.T., et al., "The Bravyi-Kitaev transformation for quantum computation of electronic structure," The Journal of chemical physics, 137(22):224109, 2012. arXiv:1208.5986, pp. 1-38 (Aug. 29, 2012).
Setia, K. et al., "Bravyi-Kitaev Superfast simulation of fermions on a quantum computer", arXiv:1712.00446v3 pp. 1-13, 2017.
Shen, Y., et al., "Quantum implementation of unitary coupled cluster for simulating molecular electronic structure", arXiv:1506.00443v2, vol. 95, No. 2, pp. 1-6 (2015).
Shor, P.W., "Polynomial-Time Algorithms for Prime Factorization and Discrete Logarithms on a Quantum Computer," SIAM Journal on Computing, vol. 26, Issue 5, 28 pages, (1997) 1484, arXiv:9508027.
Somma, R. D., "Quantum eigenvalue estimation via time series analysis," New Journal of Physics, 21(12):123025, 2019. arXiv:1907.11748, pp. 1-10 (Sep. 4, 2020).
Somma, R. D., et al., "Spectral gap amplification," SIAM Journal on Computing, 42(2):593-610, 2013. arXiv:1110.2494, Mar. 30, 2012, 14 pages.
Subasi, Y., et al., "Quantum algorithms for systems of linear equations inspired by adiabatic quantum computing," Physical review letters, vol. 122, No. 6, pp. 1-9 (Nov. 29, 2018).
Szabo, A. and Ostlund, N.S., "Modern quantum chemistry: introduction to advanced electronic structure theory," Courier Corporation, 2012. pp. 1-479 (2012).
TensorFlow, "TensorFlow Core: Tutorial," 39 pages, Last updated May 20, 2021 UTC. Accessible at https://www.tensorflow.org/tutorials/.
Terashima, H. et al., "Nonunitary quantum circuit", International Journal of Quantum Information, vol. 3, No. 4, pp. 1-19, Apr. 6, 2005.
Theodore J. Y. et al., "Fixed-point quantum search with an optimal number of queries", Physical Review Letters, Issue No. 113, vol. 21, pp. 210501-5, Nov. 2014.
Voorhis T. V. et al., "Benchmark variational coupled cluster doubles results", Journal of Chemical Physics, 113(20):8873-8879, 2000.
Wang, G., et al., "Minimizing Estimation Runtime on Noisy Quantum Computers," PRX Quantum 2.1 pp. 010346-1-49 (2021).
Wang, Z., et al., "The Quantum Approximation Optimization Algorithm for MaxCut: A Fermionic View," Arxiv.org, Cornell University, 201 Olin Library Cornell University Ithaca, NY 14853, pp. 1-13 (Jun. 9, 2017), XP081277838, DOI: 10.1103/PHYSREVA.97.022304.
Watson, J.D., et al., "The complexity of translationally invariant problems beyond ground state energies", arXiv preprint arXiv:2012.12717, pp. 1-58 (Dec. 23, 2020).
Whitfield, J. D., et al., "Simulation of electronic structure Hamiltonians using quantum computers", Molecular Physics, arXiv:1001.3855v3, vol. 109, No. 5, pp. 1-22 (2011).
Wiebe, N., et al., "Quantum Data Fitting", Phys. Rev. Lett., arXiv:1204.5242v2, pp. 1-6 (Jul. 3, 2012).
Xu, N., et al., "Quantum Factorization of 143 on a Dipolar-Coupling Nuclear Magnetic Resonance System," Physical Review Letters, arXiv:1111.3726, vol. 108, No. 13, pp. 1-5 (Mar. 30, 2012).
Yamada, S. et al., "High Performance LOBPCG Method for Solving Multiple Eigenvalues of Hubbard Model: Efficiency of Communication Avoiding Neumann Expansion Preconditione", In: Yokota R., Wu W. (eds) Supercomputing Frontiers. SCFA 2018. Lecture Notes in Computer Science, vol. 10776. Springer, Cham, pp. 243-256.
Zujev, A., "Note on Non-Unitary Quantum Gates in Quantum Computing", Working Paper, University of California, Davis, DOI: 10.13140/RG.2.2.30712.85767, pp. 1-3, 2017.
Aaronson, S., "Quantum Machine Learning Algorithms: Read the Fine Print", Nature Physics, vol. 11, pp. 1-5 (2015).
Abrams, D. S., and Lloyd, S., "A quantum algorithm providing exponential speed increase for finding eigenvalues and eigenvectors", arXiv:quant-ph/9807070v1, vol. 83, No. 24, pp. 1-9 (Jul. 24, 1998).
Airbus., "Airbus Quantum Computing Challenge: Bringing flight physics into the Quantum Era", «https://www.airbus.com/innovation/industry-4-0/quantum-technologies/airbus-quantum-computing-challenge.html», pp. 1-3 (Dec. 17, 2018).
Ambainis, A., "On physical problems that are slightly more difficult than QMA," In 2014 IEEE 29th Conference on Computational Complexity (CCC), pp. 1-12 (2014).
Anschuetz, E., et al., "Variational Quantum Factoring," arXiv:1808.08927v1. Aug. 27, 2018 [retrieved on Nov. 25, 2019], Retrieved from <https://arxiv .org/pdf/1808.08927.pdf>.
Anschuetz, E., et al., "Variational Quantum Factoring," Feb. 19, 2019, Advances in Databases and Information Systems; [Lecture Notes in Computer Science; Lect.Notes Computer], Springer International Publishing, Cham, pp. 74-85, XP047505564, ISBN: 978-3-319-10403-4.
Aspuru-Guzik, A., et al., "Simulated Quantum Computation of Molecular Energies", Science, Quantum Physics, vol. 309, No. 5741, pp. 1-21 (Sep. 9, 2005).
Atia, Y., and Aharonov, D., "Fast-Forwarding of Hamiltonians and Exponentially Precise Measurements," Nature communications. vol. 8, No. 1, pp. 1-9 (Nov. 17, 2017).
Berry, D. W. et al., "Simulating Hamiltonian Dynamics with a Truncated Taylor Series", Phys. Rev. Lett. 114, 090502 pp. 1-5, Mar. 3, 2015.
Berry, D. W., "High-order quantum algorithm for solving linear differential equations", Journal of Physics A: Mathematical and Theoretical, arXiv:1010.2745v2, vol. 47, No. 10, pp. 1-14 (Jan. 28, 2014).
Berry, D. W., et al., "Quantum algorithm for linear differential equations with exponentially improved dependence on precision", arXiv:1701.03684v2, pp. 1-20 (Feb. 17, 2017).
Brassard, G., et al., "Quantum Amplitude Amplification and Estimation", arXiv:quant-ph/0005055v1, pp. 1-22 (May 15, 2000).
Bravo-Prieto, C., et al., "Variational Quantum Linear Solver," Quantum Physics, arXiv:1909.05820, pp. 1-21 (Sep. 12, 2019).
Bravyi, L. D., et al., "Fermionic Quantum Computation", Annals of Physics, vol. 298, No. 1, pp. 210-226 (2002).
Buhrman, H. et al., "Quantum fingerprinting", Physical Review Letters, vol. 87, Issue No. 16, pp. 1-8, Sep. 2001.
Burges, C. J. C., "Factoring as Optimization," Microsoft Research, Microsoft Corporation, Tech. Rep. MSR-TR-2002-83, 19 pages (2002).
Cao, Y., "Hybrid quantum-classical algorithm for variational coupled cluster method", APS March Meeting 2019, vol. 64, No. 2, Monday-Friday, March pp. 4-8, 2019; Boston, Massachusetts.

(56) References Cited

OTHER PUBLICATIONS

Cao, Y., et al., "Potential of Quantum Computing for Drug Discovery," IBM Journal of Research and Development, vol. 62, Issue 6, pp. 6:1-6:20, (Dec. 2018).

Cao, Y., et al., "Quantum algorithm and circuit design solving the Poisson equation," New Journal of Physics, vol. 15, pp. 1-29 (Jan. 2013).

Cao, Y., et al., "Quantum Chemistry in the Age of Quantum Computing", Quantum Physics, arXiv:1812.09976v2, pp. 1-194 (Dec. 28, 2018).

Chakraborty, S., et al., "The Power of Block-encoded Matrix Powers: Improved Regression Techniques Via Faster Hamiltonian Simulation," arXiv preprint arXiv:1804.01973, pp. 1-58 (Sep. 3, 2018).

Chamorro-Posada, P., and Garcia-Escartin, J. C., "The SWITCH test for discriminating quantum evolutions", Quantum Physics, pp. 1-5 (2017).

Childs, A. M. et al., "Hamiltonian simulation using linear combinations of unitary operations", Quantum Information and Computation, vol. 12, pp. 901-924 (2012).

Childs, A. M. et al., "Quantum algorithm for systems of linear equations with exponentially improved dependence on precision", SIAM Journal on Computing vol. 46, Issue No. 6, pp. 1-31 (Jan. 2017).

Clader, B. D., et al., "Preconditioned quantum linear system algorithm", Phys. Rev. Lett., arXiv:1301.2340v4, vol. 110, No. 25, pp. 1-5 (May 7, 2013).

Dantsin, E., et al., "A deterministic (2-2/(k +1))n algorithm for k-SAT based on local search," Theoretical Computer Science 289, pp. 69-83 (2002).

Dash, A., et al., "Exact Search Algorithm to Factorize Large Biprimes and a Triprime on IBM Quantum Computer", pp. 1-13 (Jul. 2018).

Dattani, N.S., and Bryans, N., "Quantum factorization of 56153 with only 4 qubits," arXiv:1411.6758, pp. 1-6 (Nov. 27, 2014).

Dridi, R., and Alghassi, H., "Prime Factorization Using Quantum Annealing and Computational Algebraic Geometry," Nature Scientific Reports 7, Article No. 43048 (2017), 17 pages, arXiv:1604.05796.

Dunjko, V., et al., "Computational Speedups Using Small Quantum Devices," (Jul. 25, 2018), pp. 1-18 pages, arXiv:1807.08970.

Evangelista, F. A., "Alternative single-reference coupled cluster approaches for multireference problems: The simpler, the better", Journal of Chemical Physics, vol. 134(22), pp. 1-13, 2011.

Extended European Search Report dated Apr. 25, 2022, in European patent application No. 19850464.9, 11 pages.

Farhi, E., et al., "A quantum approximate optimization algorithm", Quantum Physics, arXiv:1411.4028v1, pp. 1-16 (Nov. 14, 2014).

Final Office Action dated Apr. 13, 2021, in U.S. Appl. No. 16/543,478 of Yudong Cao, filed Aug. 16, 2019, 25 pages.

Ge, Y., et al., "Faster Ground State Preparation and High-Precision Ground Energy Estimation with Fewer Qubits," Journal of Mathematical Physics, vol. 60, No. 2,: arXiv:1712.03193, 1-25 (Feb. 2, 2018).

Gharibian, S., et al., "Oracle Complexity Classes and Local Measurements on Physical Hamiltonians," In 37th International Symposium on Theoretical Aspects of Computer Science (STACS 2020). Schloss Dagstuhl-Leibniz-Zentrum für Informatik, 2020. arXiv:1909.05981, pp. 1-38 (Sep. 12, 2019).

Gharibian, S., et al., "The complexity of simulating local measurements on quantum systems," Quantum, 3:189, 2019. arXiv:1606.05626, pp. 1-38 (Apr. 7, 2020).

Gilyén, A., et al., "Quantum Singular Value Transformation and Beyond: Exponential Improvements for Quantum Matrix Arithmetics," In Proceedings of the 51st Annual ACM SIGACT Symposium on Theory of Computing, pp. 193-204, 2019. arXiv:1806.01838, Jun. 5, 2018, 67 pages.

Gingrich, R. M., and Williams, C. P., "Non-unitary probabilistic quantum computing", ACM, pp. 1-6 (Sep. 15, 2003).

Gómez-Bombarelli, R., et al., "Automatic Chemical Design Using a Data-Driven Continuous Representation of Molecules", ACS Cent. Sci., vol. 4, No. 2, pp. 268-276 (2018).

Gonthier, J., et al., "Identifying challenges towards practical quantum advantage through resource estimation: the measurement roadblock in the variational quantum eigensolver," Quantum Physics, arXiv:2012.04001, pp. 1-27 (Dec. 7, 2020).

Grover, L. K., "Fixed-point quantum search", Physical Review Letters, Issue No. 95, vol. 15, pp. 1-13, Oct. 2005.

Grover, L.K., "A fast quantum mechanical algorithm for database search", STOC '96: Proceedings of the twenty-eighth annual ACM symposium on Theory of Computing, pp. 1-8 (Jul. 1996).

Guerreschi, G. G., "Repeat-Until-Success circuits with fixed-point oblivious amplitude amplification", Phys. Rev. A 99, 022306 pp. 1-13, Aug. 10, 2018.

Harrow, A. W., et al., "Quantum algorithm for linear systems of equations", Phys. Rev. Lett., vol. 103, No. 15, 1-15 (2009).

Harsha, G. et al., "On the difference between variational and unitary coupled cluster theories", J. Chem. Phys. vol. 148, 044107, pp. 1-6, (2018).

Helgaker T. et al., "Molecular Electronic-Structure Theory", Book published by John Wiley & Sons, pp. 1-908 (2000).

Hinton, G. E., and Salakhutdinov, R.R., "Reducing the Dimensionality of Data with Neural Networks," SCIENCE, vol. 313, Issue. 5786, pp. 504-508 (Jul. 28, 2006) Available online at https://www.cs.toronto.edu/~hinton/science.pdf.

Huang, H., et al., "Near-term quantum algorithms for linear systems of equations," arXiv preprint arXiv:1909.07344, pp. 1-22 (Dec. 16, 2019).

International Search Report & Written Opinion dated Feb. 26, 2021, in international patent application No. PCT/US2020/059371, 8 pages.

Final Office Action dated Nov. 25, 2022, in U.S. Appl. No. 16/844,011 of Yudong Cao, filed Apr. 9, 2020, 32 pages.

International Search Report and Written Opinion dated Sep. 29, 2022, in PCT patent application No. PCT/US2021/062191, 8 pages.

Niu, M.Y., et al., "Learnability and Complexity of Quantum Samples," arXiv:2010.11983v1. Available at URL < https://arxiv.org/pdf/2010.11983.pdf>, pp. 1-19 (Oct. 22, 2020).

Benedetti, M., et al., "A generative modeling approach for benchmarking and training shallow quantum circuits", arXiv preprint arXiv:1801.07686v4, pp. 1-16 (Jun. 2, 2019).

Gao, N., et al., "High Dimensional Similarity Search with Quantum-Assisted Variational Autoencoder," arXiv:2006.0768v1, Available at URL https://arxiv.org/pdf/2006.07680.pdf, pp. 1-9 (Jun. 13, 2020).

Yang, S., et al., "Loop Optimization for Tensor Network Renormalization," arXiv:1512.04938v2, Available online at URL <https://arxiv.org/pdf/1512.04938.pdf>, vol. 118, No. 11, pp. 1-15 (Feb. 25, 2017).

Han, Z., et al., "Unsupervised Generative Modeling Using Matrix Product States," arXiv:1709.01662v3, Available online at URL https://arxiv.org/pdf/1709.01662.pdf, pp. 1-13 (Jul. 19, 2018).

International Search Report & Written Opinion dated Oct. 12, 2022, in international patent application No. PCT/US2022/034799, 6 pages.

Julieta Martinez et al., "Bayesian Optimization with an Empirical Hardness Model for approximate Nearest Neighbour Search," IEEE Winter Conference on Applications of Computer Vision, Jun. 2014, 8 pages.

Simon Martiel et al., "Benchmarking quantum co-processors in an application-centric, hardware-agnostic and scalable way," arXiv:2101.12973v1, Feb. 2021, 11 pages. Retrieved from <https://arxiv.org/pdf/2102.12973v1.pdf>.

Charles A. Ellis et al., "Algorithm-Agnostic Explainability for Unsupervised Clustering," arXiv:2105.08053v1, May 2021, 11 pages. Retrieved from <https://arxiv.org/vc/arxiv/papers/2105/2105.08053v1.pdf>.

Shengcai Liu et al., "On Performance Estimation in Automatic Algorithm Configuration," The Thirty-Fourth AAAI Conference on Artificial Intelligence (AAAI-20), Feb. 2020, pp. 2384-2391.

Extended European Search Report dated Dec. 5, 2022, in European patent applicaton No. 20885337.4, 11 pages.

(56) References Cited

OTHER PUBLICATIONS

Alejandro Perdomo-Ortiz et al, "Readiness of Quantum Optimization Machines for Industrial Applications," Arxiv.org, Cornell University Library, 201 Olin Library Cornell University Ithaca, NY 14853, Jul. 2, 2019, 22 pages. XP081387006, DOI: 10/1103/PHYSREVAPPLIED.12.014004.

Non-Final Office Action dated Jan. 12, 2023, in U.S. Appl. No. 16/844,011 of Yudong Cao, filed Apr. 9, 2020, 30 pages.

* cited by examiner

| Algorithm | Adaptive ansatz circuit? | Adaptive initial state? | Directly solves constrained problems? | Evolution confined to feasible subspace? | Relies on efficient indexing? |
|---|---|---|---|---|---|
| QAOA | N | N | N | N | N |
| WS-QAOA | Y | Y | N | N | N |
| QAOA | N | Y | Y | Y | N |
| QWOA | N | Y | Y | Y | Y |
| GM-QAOA | N | N | Y | Y | N |
| CBQOA | Y | Y | Y | Y | N |

FIG. 4

CLASSICALLY-BOOSTED QUANTUM OPTIMIZATION

BACKGROUND

Field of the Technology Disclosed

The disclosed technology relates to a method and system for solving combinatorial optimization problems using a classical optimization algorithm for tuning the parameters of a quantum circuit.

Description of Related Art

The subject matter discussed in this section should not be assumed to be prior art merely as a result of its mention in this section. Similarly, any problems or shortcomings mentioned in this section or associated with the subject matter provided as background should not be assumed to have been previously recognized in the prior art. The subject matter in this section merely represents different approaches, which in and of themselves can also correspond to implementations of the claimed technology.

As quantum computer technology develops, there is a growing interest in finding useful applications of near-term quantum devices. Key application areas include chemistry and materials, bioscience and bioinformatics, logistics, and finance. Also, there is a growing interest in using near-term quantum devices to solve complex problems in combinatorial optimization. Although these problems have been studied for decades using classic computers, there is a desire to use quantum circuits to solve these problems. One proposed solution for addressing combinatorial optimization problems is known as the Quantum Approximate Optimization Algorithm (QAOA), which is a hybrid quantum-classical algorithm. Using QAOA, a classical optimization algorithm tunes the parameters of a quantum circuit to maximize the probability of obtaining high-quality solutions from a final quantum state.

The Quantum Approximate Optimization Algorithm (QAOA) is considered a leading candidate for achieving a quantum advantage in combinatorial optimization problems, which may outperform the best known classical algorithms on similar optimization problems. The QAOA algorithm is, in principle, capable of solving optimization problems that arise in scheduling, data analysis, and machine learning.

Unfortunately, the quantum approximate optimization algorithm (QAOA) and other related quantum optimization algorithms have several limitations and drawbacks. In its current form, the QAOA will not outperform other competing quantum algorithms. For example, QAOA for Max-Cut requires hundreds of qubits for quantum speed up, rather than the small number of qubits that are possible today using Noisy Intermediate Scale Quantum (NISQ) devices without active error correction. With these constraints, it becomes unlikely that QAOA will provide any speedup with lower-depth quantum circuits. The disclosed technology overcomes the limitations of known QAOA algorithms.

SUMMARY

The disclosed technology combines classical computing methods and quantum computing methods to solve combinatorial optimization problems. Specifically, in one embodiment, a classical algorithm is run to find an approximate solution. Then, a quantum circuit is run, which searches its "neighborhood" for higher-quality solutions. The classical optimization algorithm tunes the parameters (evolution times) of the quantum circuit to maximize the probability of obtaining high-quality solutions from the final quantum state.

In one aspect, the disclosed technology is a variational quantum algorithm for solving combinatorial optimization problems. In the following discussion, the disclosed method is hereinafter referred to as a Classically-Boosted Quantum Optimization Algorithm (CBQOA), and the approximate solution is hereinafter referred to as the "seed." In one aspect, the algorithm provides an efficient continuous-time quantum walk (CTQW) on a graph that connects the feasible solutions. This disclosed CBQOA method combines CTQW with the output of a classical optimization algorithm to create a superposition of the feasible solutions, which are then processed, as will be described. In another aspect, an iterative optimizer is used to tune the quantum circuit parameters to maximize the probability of obtaining high-quality solutions from the final quantum state.

The disclosed CBQOA method is capable of solving a wide range of combinatorial optimization problems, including all unconstrained problems and many important constrained problems such as Max Bisection, Max Independent Set, Min Vertex Cover, Portfolio Optimization, Traveling Salesperson, and others. The disclosed CBQOA method advantageously solves constrained problems without modifying their cost functions, confines the evolution of the quantum state to the feasible subspace, and does not rely on efficient indexing of the feasible solutions as previous methods required. The disclosed CBQOA can be readily applied to applications such as Max 3SAT and Max Bisection, providing empirical evidence that it outperforms previous approaches to these problems.

In one embodiment of the disclosed technology, a method is disclosed, performed on a hybrid quantum-classical computer system, for finding a problem solution to a combinatorial optimization problem. The hybrid quantum-classical computer system may comprise a classical computer and a quantum computer. The classical computer may include a processor, a non-transitory computer readable medium, and computer instructions stored in the non-transitory computer readable medium. The quantum computer may include a quantum component, having a plurality of qubits, which accepts a sequence of instructions to evolve a quantum state based on a series of quantum gates. Computer instructions, when executed by the processor, perform a method including defining a combinatorial optimization problem to be solved, having a domain F. A classical optimization algorithm may be used as a pre-processor to select an approximate solution or seed.

In one aspect, a quantum state is evolved in a quantum circuit based on the seed approximate solution. An undirected graph is generated that connects the feasible solutions. Using continuous-time quantum walk (CTQW), a search may be conducted for feasible solutions in the neighborhood of the seed. Also, in one aspect, the method may include an iterative optimizer for tuning the quantum circuit parameters to maximize the probability of obtaining feasible solutions with low cost-function values. In another aspect, the CBQOA quantum circuit is run with optimal parameters. The final state is measured in the computational basis to obtain a solution with lower cost-function value than the seed, thereby providing an enhanced problem solution.

In another aspect, the enhanced problem solution is more precise than the seed received from the classical algorithm. In another aspect, a classical optimization algorithm is chosen to find a feasible solution (the seed) in polynomial time. The classical algorithm may be of different types. The classical algorithm may be based on simulated annealing. The classical algorithm may be based on semi-definite programming. The classical algorithm may be based on spectral graph theory.

In another embodiment, the problem solved is a Max Bisection problem. Also, the problem solved may be a Max Independent Set problem. In and out of their embodiment, the problem solved may be a Max 3SAT problem.

In another embodiment, the problem solved may be a Portfolio Optimization problem. Also, the problem solved may be a Traveling Salesperson problem.

In another aspect, a constrained problem may be solved without modifying its cost function. In one aspect, the solution may be provided where indexing of feasible solutions is not required.

In another embodiment, a hybrid quantum-classical computer system is provided for finding a problem solution to a combinatorial optimization problem. In one embodiment of the disclosed technology, a method is disclosed, performed on a hybrid quantum-classical computer system, for finding a problem solution to a combinatorial optimization problem. The hybrid quantum-classical computer system may comprise a classical computer and a quantum computer. The classical computer may include a processor, a non-transitory computer readable medium, and computer instructions stored in the non-transitory computer readable medium. The quantum computer may include a quantum component, having a plurality of qubits, which accepts a sequence of instructions to evolve a quantum state based on a series of quantum gates. Computer instructions, when executed by the processor, perform a method including defining a combinatorial optimization problem to be solved, having a domain F. A classical optimization algorithm may be used as a pre-processor to select an approximate solution or seed.

In one aspect, a quantum state is evolved in a quantum circuit based on the seed approximate solution. An undirected graph is generated that connects the feasible solutions. Using continuous-time quantum walk (CTQW), a search may be conducted for feasible solutions in the neighborhood of the seed. Also, in one aspect, the method may include an iterative optimizer for tuning the quantum circuit parameters to maximize the probability of obtaining feasible solutions with low cost-function values. In another aspect, the CBQOA quantum circuit is run with optimal parameters. The final state is measured in the computational basis to obtain a solution with lower cost-function value than the seed, thereby providing an enhanced problem solution.

In another aspect, the CBQOA quantum circuit is run with optimal parameters. The final state is measured in the computational basis to obtain the smallest cost function output as a result, thereby providing the enhanced problem solution.

BRIEF DESCRIPTION OF THE DRAWINGS

The disclosed technology, as well as a preferred mode of use and further objectives and advantages thereof, will best be understood by reference to the following detailed description of illustrative embodiments when read in conjunction with the accompanying drawings. In the drawings, like reference characters generally refer to like parts throughout the different views. The drawings are not necessarily to scale, with an emphasis instead generally being placed upon illustrating the principles of the technology disclosed.

FIG. 4 illustrates, in table format, a comparison between various known variational quantum algorithms for solving combinatorial optimization problems;

DETAILED DESCRIPTION

Introduction

Figure 1:
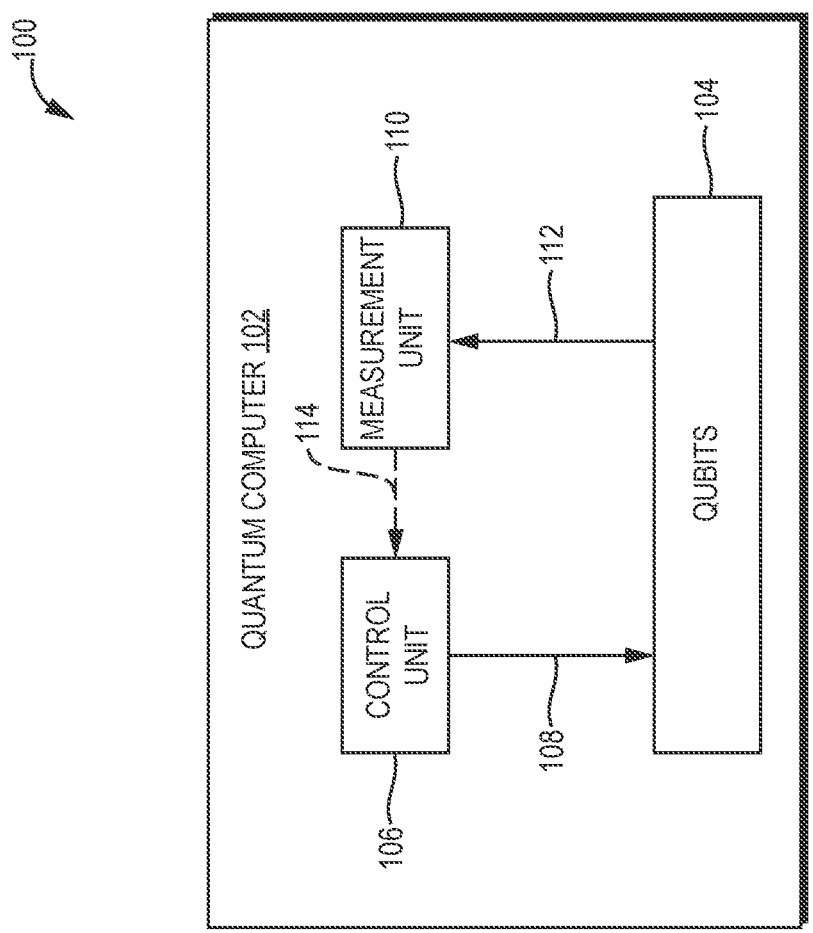
FIG. 1 is a diagram of a quantum computer according to one embodiment of the present invention.

In one embodiment, the disclosed technology provides a method of enhancing quantum optimization for solving combinatorial optimization by using a classical algorithm combined with a quantum circuit. Specifically, a classical algorithm (Classical Boosting) is run to provide an approximate or "seed" solution which is then used by a quantum circuit to search its "neighborhood" for higher-quality solutions.

The disclosed Classically-Boosted Quantum Optimization Algorithm (CBQOA) may be used to solve a wide range of combinatorial optimization problems, including all unconstrained problems and many important constrained problems such as Max Bisection, Max Independent Set, Min Vertex Cover, Portfolio Optimization, Traveling Salesperson and so on.

In one embodiment of the disclosed technology, a continuous-time quantum walk (CTQW) is provided on a properly-constructed graph, which connects the feasible solutions. The CBQOA method uses CTQW, along with the output of an efficient classical algorithm to create a suitable superposition of the feasible solutions, which are then processed. This disclosed method has several advantages. It may be used to solve constrained problems without modifying their cost functions. It confines the evolution of the quantum state to the feasible subspace. Also, it does not rely on efficient indexing of the feasible solutions as some previous methods require.

In another aspect, as long as the domain of the problem satisfies certain conditions, a weighted undirected graph may be constructed for connecting the feasible solutions so that the CTQWs on this graph can be efficiently implemented. Under these conditions, the CBQOA method uses an efficient classical algorithm to generate a seed and runs CTQW, starting at the seed to create a suitable superposition of the feasible solutions (the initial state of CBQOA). Using this method, the amplitudes of the high-quality solutions are amplified within this state by alternately applying generalized reflections about the initial state and the time evolutions of the cost Hamiltonian multiple times, before measuring the final state in the computational basis.

In another aspect of the disclosed technology, the design of the ansatz circuit ensures that only feasible solutions are obtained from this measurement. As in other variational quantum algorithms, CBQOA employs an iterative optimizer to tune the circuit parameters to maximize the probability of receiving high-quality solutions from the final state.

A number of variational quantum algorithms have been proposed to solve combinatorial optimization problems. Referring to FIG. 4, a comparison of known approaches is illustrated, showing that the disclosed technology is the only algorithm with favorable properties for multiple applications. The various algorithms include:
a. Quantum Approximation Optimization Algorithm (QAOA)
b. Warm-Started Quantum Approximation Optimization Algorithm (WS-QAOA)
c. Quantum Alternating Operator Ansatz ($\overline{QAOA}$ or QAOA2)
d. Quantum-Walk-assisted Optimization Algorithm (QWOA)
e. Grover-Mixer Quantum Alternating Operator Ansatz While QAOA and GM-QAOA have fixed ansatz circuits and fixed initial states, QAOA2 and QWOA have fixed ansatz states but adaptive initial states. By contrast, WS-QAOA and CBQOA utilize efficient classical pre-processing to adaptively construct both the ansatz circuit and initial state, so that the initial state has large overlap with the basis states corresponding to high-quality solutions, and this overlap is amplified efficiently by the ansatz circuit.

Both QAOA and WS-QAOA handle constrained problems by adding a penalty term (which depends on the constraints) to the cost function, thus converting the original problem to an unconstrained problem. However, this approach has two drawbacks. First, it is less efficient than ideal, because it needs to search the whole space—which could be much larger than the feasible subspace—for a satisfactory solution. Second, the penalty term needs to be properly designed to ensure that the solution to the modified problem is a high-quality feasible solution to the original problem, which can be problematic. In contrast, QAOA2, QWOA, GM-QAOA, and CBQOA construct their ansatz circuits and initial states carefully, so that they directly solve constrained problems without modifying their cost functions, and they confine the evolution of the quantum state to the feasible subspace, which makes these algorithms more efficient.

QWOA requires that the feasible solutions can be efficiently indexed so that the CTQW in the algorithm can be efficiently implemented. However, this condition is unlikely to hold for some optimization problems (e.g., Max Independent Set and Min Vertex Cover). In contrast, QAOA, WS-QAOA, QAOA2, QWOA, GM-QAOA and CBQOA do not rely on this assumption and hence can solve a larger class of optimization problems.

As previously stated, the disclosed CBQOA method is the only method that uses efficient classical pre-processing to adaptively construct the ansatz circuit and initial state; solves constrained problems without modifying their cost functions; confines the evolution of the quantum state to the feasible subspace; and does not rely on efficient indexing of the feasible solutions. Thus, the disclosed CBQOA method possesses all the desirable qualities for a variational algorithm. From FIG. 4, it can be is seen that the disclosed CBQOA method is the only known method that has exhibits several favorable properties simultaneously.

Overview of CBQOA

Figure 5:
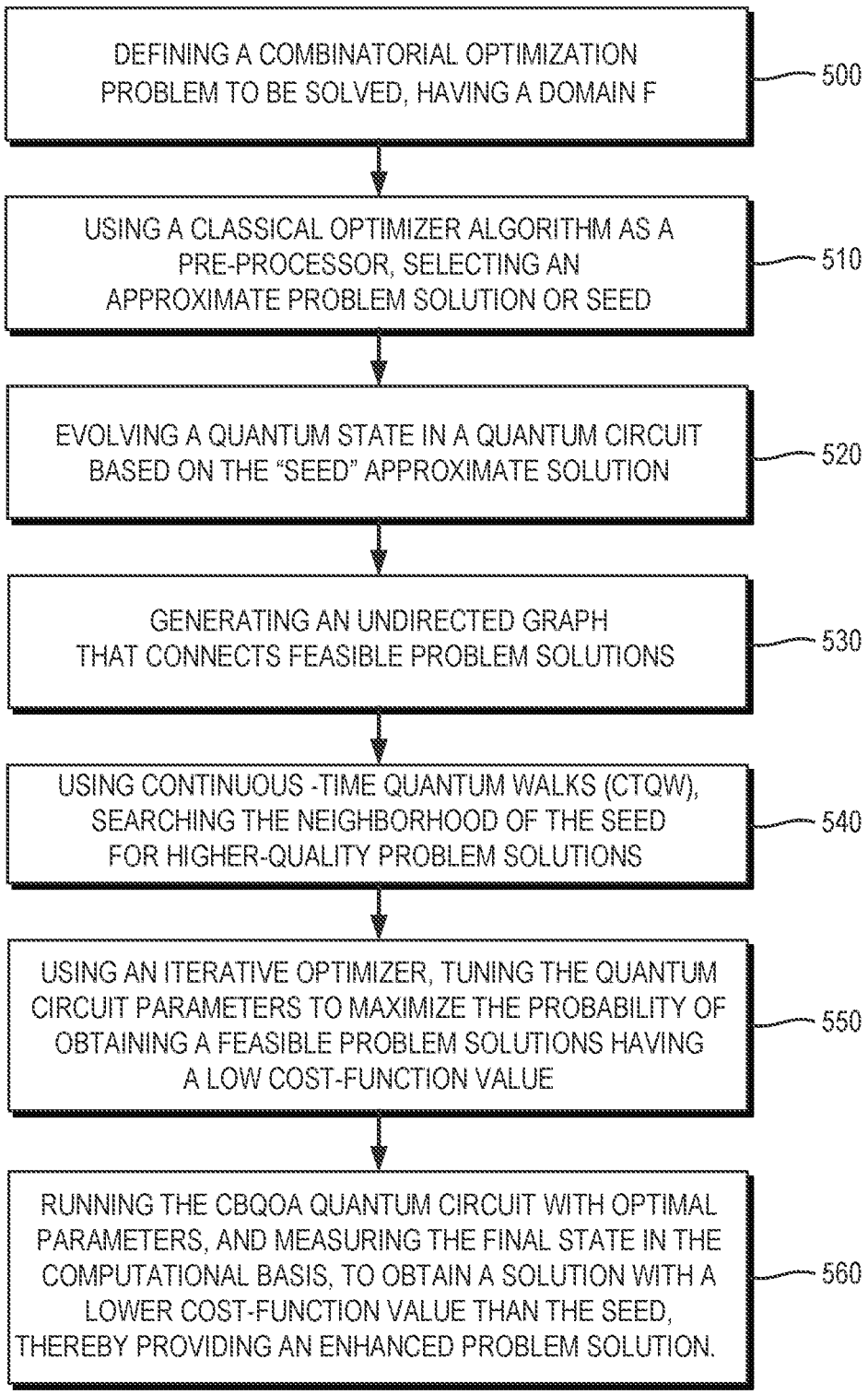
FIG. 5 is a block diagram illustrating the steps in the disclosed Classically-Boosted Quantum Optimization Algorithm.

FIG. 5 shows a block diagram of the disclosed CBQOA method. In block 500, a combinatorial optimization to be solved is defined, having a domain F. In step 510, using a classical optimization algorithm as a preprocessor, an approximate solution or seed is selected. In step 520, a quantum state is evolved in a quantum circuit based on the seed approximate solution. In step 530, an undirected graph that connects feasible problem solutions is generated. In step 540, using continuous-time quantum walks (CTQW), the neighborhood of the seed is searched for higher-quality problem solutions. In step 550, using an iterative optimizer, the quantum circuit parameters are tuned to maximize the probability of obtaining a feasible problem solution with low cost function value. In step 560, a CBQOA quantum circuit is run with the optimal parameters. The final state in the computational basis is measured to obtain a solution with a lower cost function value than the seed, thereby providing an enhanced problem solution.

Without loss of generality, any combinatorial optimization problem can be represented as a cost function $f: F \subseteq \{0,1\}^n \to \mathbb{R}$, where F is the domain of the problem (i.e. the set of feasible solutions). The goal is to find a minima of this function, i.e.

$$x^* = \underset{x \in F}{\mathrm{argmin}} f(x).$$

To solve this problem on a quantum device, $f$ is encoded into an n-qubit Ising Hamiltonian $H_f \Sigma_{x \in \{0,1\}^n} f(x)|x\rangle\langle x|$ (i.e. cost Hamiltonian), and assume that $e^{-iH_f t}$ can be implemented with poly (n) elementary gates for arbitrary $\gamma \in \mathbb{R}$. This is true if $f$ can be written as an O(log (n))-degree polynomial with poly (n) terms in its variables, which means that $H_f$ can be decomposed into poly (n) commuting O(log (n))-local terms. This condition is satisfied by many natural combinatorial optimization problems.

Figure 6:
FIG. 6 schematically illustrates a quantum circuit for CBQOA.

FIG. 6 illustrates the CBQOA quantum circuit for addressing the above problem. Here $z=(z_1, z_2, \ldots, z_n)$ is a feasible solution generated by a classical algorithm, and $|\psi\rangle = e^{iAt}|\rangle$ in which A is defined further on. It requires two elements to operate:
1. An efficient classical algorithm for producing a feasible solution $z \in F$ (which will be referred to as the seed hereinafter;
2. An efficiently-implementable CTQW $e^{iAt}$ on a weighted undirected graph G=(V, E, w) such that: (1) G depends on $f$ and z; (2) V=$\{0,1\}^n$; (3) F and V\F are disconnected in G; (4) The induced subgraph of G on F is the union of poly (n) connected components of G.

The construction of G and the implementation of $e^{iAt}$ will be described further on. By design, the state $|\psi\rangle := e^{iAt}|z\rangle$ is a superposition of the feasible solutions, i.e. $|\psi\rangle \in \mathcal{H}^F = \{|x\rangle : x \in F\}$. Ideally, z's neighborhood in G must contain as many high-quality feasible solutions as possible, so that $e^{iAt}|z\rangle$ has large overlap with the states corresponding to those solutions for some small t. While this is difficult to achieve in general, advantage is taken of the fact that for most optimization problems, similar solutions tend to have similar qualities, and a well-performing classical approximation algorithm is used to generate the seed. This strategy proves to be effective in the experiments described herein.

After preparing the state $|\psi\rangle = e^{iAt}|z\rangle$, two types of unitary operations are alternately performed multiple times, receiving the ansatz state $$|\psi(\vec{\beta},\vec{\gamma})\rangle e^{-i\beta_p|\psi\rangle\langle\psi|}e^{-i\gamma_p H_f}e^{-i\beta_{p-1}|\psi\rangle\langle\psi|}e^{-i\gamma_{p-1}H_f} \ldots e^{-i\beta_1|\psi\rangle\langle\psi|}e^{-i\gamma_1 H_f}|\psi\rangle,$$

where p is the number of circuit layers, $\vec{\beta} = (\beta_1, \beta_2, \ldots, \beta_p)$, $\vec{\gamma} = (\gamma_1, \gamma_2, \ldots, \gamma_p) \in \mathbb{R}^p$ are tunable parameters. Following the convention, each $e^{-i\beta_j|\psi\rangle\langle\psi|}$ a will be designated mixing operator and each $e^{-i\gamma_j H_f}$ phase separator, although the disclosed algorithm is closer to amplitude amplification than to QAOA. Note that each mixing operator $e^{-i\beta_j|\psi\rangle\langle\psi|}$ can be implemented based on the equation:

$$e^{-i\beta_j|\psi\rangle\langle\psi|} = e^{iAt}e^{-i\beta_j|z\rangle\langle z|}e^{-iAt},$$

where $e^{-i\beta_j|z\rangle\langle z|}$ can be implemented with O(n) elementary gates (with the help of n−1 ancilla qubits). The CBQOA circuit is indeed efficient.

By construction, $|\psi(\vec{\beta},\vec{\gamma})\rangle \in \mathcal{H}_F$ is set for arbitrary $(\vec{\beta},\vec{\gamma}) \in \mathbb{R}^{2p}$. Measuring it in the computational basis always yields a feasible solution. In fact, the evolution of the quantum state is confined to the feasible subspace $\mathcal{H}_F$ throughout the CBQOA circuit. This is beneficial when F is much smaller than $\{0,1\}^n$, as it makes the search for high-quality feasible solutions more efficient.

Next, the parameters $(\vec{\beta},\vec{\gamma})$ are tuned by by minimizing the Conditional Value at Risk (CVaR) of the cost of a random solution sampled from $|\psi(\vec{\beta},\vec{\gamma})\rangle$. Specifically, the CVaR of a random variable X for a confidence level $\alpha \in (0,1]$ is defined as $$\underset{\alpha}{CVaR}(X) \mathbb{E}[X \mid X \leq F_X^{-1}(\alpha)],$$

where $F_x$ is the cumulative density function of X. In other words, $$\underset{\alpha}{CVaR}(X)$$

is the expected value of the lower $\alpha$-tail of the distribution of X. In our task, X is defined as follows. Measurement of $|\psi(\vec{\beta},\vec{\gamma})\rangle$ is made in the computational basis, to obtain a random solution $X_{\vec{\beta},\vec{\gamma}}$ in F such that $$\mathbb{P}[X_{\vec{\beta},\vec{\gamma}}=x] = |\langle x|\psi(\vec{\beta},\vec{\gamma})\rangle|^2, \forall x \in F.$$

Then $(\vec{\beta},\vec{\gamma})$ is set to be the solution to the following problem:

$$\min_{\vec{\beta},\vec{\gamma}\in\mathbb{R}^p} \underset{\alpha}{CVaR}\left(f(X_{\vec{\beta},\vec{\gamma}})\right),$$

where $\alpha \in (0,1]$ is the confidence level. In particular, when $\alpha=1$, $$\underset{\alpha}{CVaR}(f(X_{\vec{\beta},\vec{\gamma}})) = \mathbb{E}[f(X_{\vec{\beta},\vec{\gamma}})].$$

In this case, the average cost is minimized for a random solution X sampled from $|\psi(\vec{\beta},\vec{\gamma})\rangle$. The optimal choice of $\alpha$ depends on the specific situation (e.g. the problem to solve and its size). In experiments described herein, $\alpha=0.5$ leads to satisfactory performance. An iterative optimizer is used, in which each evaluation of $$\underset{\alpha}{CVaR}(f(X))$$

involves running the CBQOA circuit on a quantum device or simulating it on a classical computer.

State Preparation by Continuous-Time Quantum Walks

A CTQW is the evolution of a quantum system under a Hamiltonian defined by the adjacency matrix of a graph. Formally, suppose G=(V, E, w) is a weighted undirected graph, where w: E→$\mathbb{R}$ assigns a weight to each edge. The continuous-time quantum walk U(t) on G at time t is given by $$U(t)e^{iAt},$$

where A is the adjacency matrix of G (i.e. A is a symmetric $|V|\times|V|$ matrix such that A[u, v]=$w_{u,v}$ if (u, v)∈E, and 0 otherwise). The probability of a walk starting at vertex v ending up at vertex u at time t is given by $|\langle u|U(t)|v\rangle|^2$. More generally, if the walk is started with a superposition of the vertices, i.e. $|\psi\rangle = \Sigma_{v\in V}\alpha_v|v\rangle$, the probability of the walk ending up at vertex u at time t is given by $|\langle u|U(t)|\psi\rangle|^2$.

CTQWs possess different characteristics from continuous-time random walks (CTRWs). For example, the probability distribution of the vertices during a CTRW converges to a stationary distribution given enough time, but such a distribution does not exist for a generic CTQW. Namely, the probability distribution of the vertices during a generic CTQW constantly changes over time. Therefore, careful selection is needed to pick t so that $U(t)|\psi\rangle$ has the desired property.

Building the Graph

For convenience, the following notation and definitions are introduced. For any integer n≥1, let [n]{1,2, ..., n}. For any S ⊆[n], let $S^c$[n]\S. For any x∈$\{0,1\}^n$, let supp (x) {j∈[n]: $x_j$=1}. Moreover, for any S ⊆[n] and x∈$\{0,1\}^n$, let $x_s$ be the restriction of x to the coordinates in S, i.e. $x_s(x_i: i\in S)$. Finally, a permutation $\tau: \{0,1\}^n \to \{0,1\}^n$ is k-local if there exist C,S ⊆[n] and y∈$\{0,1\}^{|c|}$ such that: (1) |S|=k; (2) C∩S=∅; (3) $(\tau(x))s_c=x_s$ for all x∈$\{0,1\}^n$; (4) If C≠∅, then $\tau(x)=x$ for all x∈$\{0,1\}^n$ satisfying $x_c\neq y$.

The next step is the conA weighted undirected graph G=(V, E, w) such that V=$\{0,1\}^n$ (i.e., each vertex is a unique n-bit string), and E and w: E→$\mathbb{R}$ depend on the cost function f: F⊆$\{0,1\}^n \to \mathbb{R}$ and the seed z∈F, under the following assumption:

Assumption 1. There exist m=poly (n) efficiently-computable permutations $\tau_1, \tau_2, \ldots, \tau_m$: $\{0,1\}^n \to \{0,1\}^n$ such that:
1. For each $i \in [m]$, $\tau_i$ is $O(\log(n))$-local.
2. For each $i \in [m]$, $\tau_i$ has order 2, i.e., $\tau_i(\tau_i(x))=x$ for all $x \in \{0,1\}^n$, and $\tau_i$ is not the identity permutation.
3. There exist k=poly (n) subsets $F_1, F_2, \ldots, F_k$ of F such that:
    (a) $(F_1, F_2, \ldots, F_k)$ forms a partition of F;
    (b) For each $i \in [m]$ and each $j \in [k]$, $\tau_i$ maps $F_j$ to itself, i.e., $F_j = \tau_i(F_j)\{\tau_i(x): x \in F_j\}$.
    (c) For each $j \in [k]$, every two elements in $F_j$ can be transformed from one to another by a sequence of operations in $\mathcal{T}\{\tau_1, \tau_2, \ldots, \tau_m\}$. Namely, for arbitrary $x, y \in F_j, x \neq y$, there exist an integer $q \geq 1$ and $i_1, i_2, \ldots, i_q \in [m]$ such that $y = \tau_{i_q}(\tau_{i_{q-1}}(\ldots \tau_{i_1}(x)))$.

This assumption holds for a wide range of combinatorial optimization problems, including all unconstrained problems (e.g., Max Cut, Max 3SAT), the constrained ones with permutation-invariant domains (e.g., Max Bisection), Max Independent Set, Min Vertex Cover, Portfolio Optimization, Traveling Salesperson, and so on. Specifically, the permutations $\mathcal{T} = \{\tau_1, \tau_2, \ldots, \tau_m\}$ and the partition $(F_1, F_2, \ldots, F_k)$ of the domain F can be constructed for these problems as follows:

In an unconstrained problem, $F=\{0,1\}^n$ and can define $\mathcal{T}$ in multiple ways. The common choice is $\mathcal{T}\{\tau_1, \tau_2, \ldots, \tau_n\}$, where $\tau_i(x) = (x_1, \ldots, X_{i-1}, \neg x_i, x_{i+1}, \ldots, x_n)$ for all $x \in \{0,1\}^n$. Namely, $\tau_i$ flips the i-th bit of the input string. The corresponding partition of F is the trivial partition (F).

In a constrained problem where F is invariant under the permutations of the n bits, i.e., $F=\sigma(F)\{(x_{\sigma(1)}, x_{\sigma(2)}, \ldots, x_{\sigma(n)}): x \in F\}$ for all $\sigma \in S_n$, $\mathcal{T}$ is defined as follows. Let $\tilde{G}=(\tilde{V},\tilde{E})$ be any connected graph with vertex set $\tilde{V}=[n]$. Then let $\mathcal{T}\{\tau_{a,b}: (a, b) \in \tilde{E}\}$, where $\tau_{a,b}$ swaps the a-th and b-th bits of the input string. Namely, $(\tau_{a,b}(x))_a = x_b$, $(\tau_{a,b}(x))_b = x_a$, and $(\tau_{a,b}(x))_j = x_j$ for $j \in [n]\setminus\{a,b\}$, for all $x \in \{0,1\}^n$. The corresponding partition of F is $(\overline{F}_{j_1}, \overline{F}_{j_2}, \ldots, \overline{F}_{j_k})$ for some $0 \leq j_1 < j_2 < \ldots < j_k \leq$ en, where $$\overline{F}_j\left\{x \in \{0,1\}^n: \sum_{i=1}^n x_i = j\right\}$$

for any $j \in \{0, 1, \ldots, n\}$.

In the Max Independent Set problem, one is given a graph $G=(V, E)$ and needs to find a subset W of V such that no two vertices in W are adjacent and $|W|$ is maximized. Suppose $|V|=n$. Then each subset of V can be represented by an n-bit string in the natural way. Next $\mathcal{T}\{\tau_v: v \in V\}$ is defined, where $\tau_v$ satisfies that $$(\tau_v(x))_v = \begin{cases} \neg x_v, & \text{if } x_u = 0, \forall u \in N(v), \\ x_v, & \text{otherwise} \end{cases} \quad (7)$$

in which N(v) denotes the set of v's neighbors in G, and $(\tau_v(x))_u = x_u$ for all $u \in V\setminus\{v\}$. The corresponding partition of F is the trivial partition (F). The Min Vertex Cover problem can be handled similarly, except that the roles of 1 and 0 are switched.

In the Portfolio Optimization problem, one needs to minimize the cost function $$f(s) = \lambda \sum_{i,j=1}^n \sigma_{i,j} s_i s_j - (1-\lambda) \sum_{i=1}^n r_i s_i$$

subject to the constraint $$\sum_{i=1}^n s_i = A,$$

where $\sigma_{i,j} \in \mathbb{R}$ $r_i \geq 0$, $\lambda \in [0,1]$ and $A \in [n]$ are given parameters, and $s_1, s_2, \ldots, s_n \in \{1, -1, 0\}$ are the variables. This problem can be converted into a problem with binary variables as follows. For each $i \in [n]$, introduce two variables $x_{2i-1}, x_{2i} \in \{0,1\}$ such that $s_i = x_{2i-1} - x_{2i}$. Then the original domain is mapped to $$F\left\{x \in \{0,1\}^{2n}: \sum_{i=1}^n x_{2i-1} - \sum_{i=1}^n x_{2i} = A\right\},$$

and the cost function $f$ can be re-written in terms of $x_1, x_2, \ldots, x_{2n}$. Parameter $\mathcal{T}$ is defined as follows. Let $\tilde{G}_1 = (\tilde{V}_1, \tilde{E}_1)$ and $\tilde{G}_2 = (\tilde{V}_2, \tilde{E}_2)$ be two arbitrary connected graphs with vertex sets $\tilde{V}_1 = \tilde{V}_2 = [n]$. Then let $\mathcal{T}\{\tau_{2i-1,2j-1}: (i,j) \in \tilde{E}_1\} \cup \{\tau_{2i,2j}: (i,j) \in \tilde{E}_2\}$, where $\tau_{a,b}$ swaps the a-th and b-th bits of the input string. Namely, $(\tau_{a,b}(x))_a = x_b$, $(\tau_{a,b}(x))_b = x_a$, and $(\tau_{a,b}(x))_j = x_j$ for $j \in [2n]\setminus\{a, b\}$, for all $x \in \{0,1\}^{2n}$. The corresponding partition of F is $(\overline{F}_0, \overline{F}_1, \text{ts}, \overline{F}_{n-A})$ where $$\overline{F}_j\left\{x \in \{0,1\}^{2n}: \sum_{i=1}^n x_{2i-1} = A+j, \sum_{i=1}^n x_{2i} = j\right\}$$

for each j.

In the Traveling Salesperson problem, one is given a list of n cities and the distances between each pair of cities, and the problem is to find the shortest route that visits each city exactly once and returns to the origin city. Each feasible solution is a permutation of [n], and can be represented by an $n\lceil \log_2(n) \rceil$-bit string. Namely, every feasible solution is represented by some $x=(\vec{x}_1, \vec{x}_2, \ldots, \vec{x}_n)$, where $\vec{x}_i = x_{i,1}, x_{i,2}, \ldots, x_{i,t} \in \{0,1\}^t$ indexes the i-th city on the route, in which $t = \lceil \log_2(n) \rceil$. This is designated as $\vec{x}_i$ the i-th segment of x. Parameter $\mathcal{T}$ is then defined as follows. Let $\tilde{G}=(\tilde{V},\tilde{E})$ be any connected graph with vertex set $\tilde{V}=[n]$. Then let $\mathcal{T}\{\tau_{a,b}: (a, b) \in \tilde{E}\}$, where $\tau_{a,b}$ swaps the a-th and b-th segments of the input string. Namely, for arbitrary $x \in \{0,1\}^n$, $(\tau_{a,b}(x))_{a,j} = (\tau_{a,b}(x))_{b,j}$, for all $j \in [t]$; $(\tau_{a,b}(x))_{b,j} = (\tau_{a,b}(x))_{a,j}$, for all $j \in [t]$; $(\tau_{a,b}(x))_{c,j} = (\tau_{a,b}(X))_{c,j}$, for all $j \in [t]$, for all $c \in [n]\setminus\{a, b\}$. The corresponding partition of F is the trivial partition (F).

The above constructions can be verified to satisfy the conditions in Assumption 1, and can generalize them to similar combinatorial optimization problems. Under Assumption 1, $G=(\{0,1\}^n, E, w)$ is built as follows. The edge set E is the disjoint union of m edge sets $E_1, E_2, \ldots, E_m$, where $E_i = \{(x, \tau_i(x)): x \in \{0,1\}^n, x \neq \tau_i(x)\}$ for $i=1, 2, \ldots, m$. Moreover, all the edges in $E_i$ share the same weight $w_i \in (0,1)$ (which will be determined later) for each $i \in [m]$. Formally, the adjacency matrix A of this graph is defined as $$A = \sum_{i=1}^m w_i H_i,$$

where $H_i$ is a matrix given by $$H_i = \sum_{x \in \{0,1\}^n} 1_{\tau_i(x) \neq x} |\tau_i(x)\rangle\langle x|,$$

where 1 is the indicator function. By construction, H has zero diagonal entries and non-negative off-diagonal entries. Moreover, by conditions 2, 3a and 3b of Assumption 1, it is known that $H_i$ is Hermitian, has eigenvalues in $\{1, -1, 0\}$, and satisfies $$H_i = \sum_{j=1}^{k} P_j H_i P_j + (I-P)H_i(I-P),$$

where $P_j = \sum_{x \in F_j} |x\rangle\langle x|$, for $j=1,2,\ldots,k$, and $$P = \sum_{j=1}^{k} P_j.$$

As a consequence, A is a valid adjacency matrix and satisfies $$A = \sum_{j=1}^{k} P_j A P_j + (I-P)A(I-P),$$

which means that $F_1, F_2, \ldots, F_k$ and V\F are disconnected in G. Furthermore, conditions 1 and 1 of Assumption 1 imply that for each $j \in [k]$, every two vertices in $F_j$ are connected by a path through only vertices in $F_j$. Thus, the induced subgraph of G on $F_j$ is a connected component of G for each $j \in [k]$.

It remains to determine the edge weights $w_i$'s. In principle, it is desirable to assign a large weight $w_i$ to each edge in $E_i$ if $\tau_i(x)$ is likely to be a better solution than x for a typical x close to z, and a small weight otherwise. Meanwhile, being extremely biased towards a particular permutation $\tau_i$ is to be avoided, so the magnitude of $w_i$ needs to stay in a reasonable range. For these reasons, $w_i$ is set to be a sigmoid function of $\eta_i =: = f(z) - f(\tau_i(z))$:

$$w_i = w_i(\theta) \frac{1}{1+e^{-\eta_i\theta}} = \frac{1}{1+e^{-\theta[f(z)-f(\tau_i(z))]}},$$

where $\theta \in \mathbb{R}$ is a tunable parameter. Note that $w_i \in [0,1]$, and $w_i$ is a monotonically increasing function of $\eta_i$ for fixed $\theta > 0$. (In particular, setting $\theta = 0$ leads to $w_i = \frac{1}{2}$ for all i's, which means that all the edges in G share the same weight. In this case, all the permutations $\tau_i$'s are treated equally.) It is acknowledged that this choice of $w_i$ may be not optimal, and may be improved in future work.

Implementing the CTQW

In principle, since A is a $2^n \times 2^n$ Hermitian matrix and each row of A contains poly (n) non-zero entries whose locations and values can be efficiently computed, Hamiltonian simulation techniques can be used to implement the CTQW $U(t) = e^{iAt}$ on the graph G=(V, E, w). But in order to minimize the complexity of the circuit for this task, a simple Trotterization method is chosen which is based on the equation:

$$e^{iAt} = \left(\prod_{j=1}^{m} e^{iw_j H_j t/N}\right)^N + O\left(\frac{t^2}{N}\right).$$

Namely, the quantum circuits are concatenated for $e^{iw_j H_j t/N}$ for $j=1,2,\ldots,m$ and repeat it N times. Each $e^{iw_j H_j t/N}$ can be implemented efficiently for the following reason. By conditions 1 and 2 of the Assumption, it is known that $e^{iH_j t}$ either acts non-trivially on O(log (n)) qubits, or is a controlled version of such an operation (i.e. up to a permutation of the n qubits, $e^{iH_j t}$ is equivalent to $|y\rangle\langle y| \otimes V \otimes I + (I-|y\rangle\langle y|) \otimes I \otimes I$ for some $y \in \{0,1\}^q$ for some $q \in [n]$ and O(log (n))-qubit unitary operation V.) In both cases, $e^{iH_j t}$ can be implemented with poly (n) elementary gates(with the help of at most n−1 qubits) for arbitrary $\gamma \in \mathbb{R}$. It follows that the final circuit for the CTQW has poly (n) depth assuming N=poly (n).

In fact, for our purpose, it is not necessary to have faithful implementation of $U(t) = e^{iAt}$. Essentially, a unitary operation W is needed such that for any $j \in [k]$ and $z \in F_j$, W|z⟩ is a superposition of the elements in $F_j$, and ⟨x|W|z⟩ is large only if x is close to z. One can see that $$U'(t)\left(\prod_{j=1}^{m} e^{iw_j H_j t/N}\right)^N$$

satisfies this crucial property. It can be used to replace U(t), as the latter is often expensive to implement exactly.

Note, however, that a difference between U(t) and U'(t) is that for any $j \in [k]$ and x, $z \in F_j$, then ⟨x|U(t)|z⟩ ≠0 for generic t, whereas ⟨x|U'(t)|z⟩ ≠0 only if the distance between x and z in G is atmost Nm. In other words, the ideal CTQW starting at z can explore the whole connected component of G that z lies in, while its approximation can only explore z's neighborhood in G unless Nm is sufficiently large. Nevertheless the above equation implies that when t is small, U(t) and U'(t) do not differ much. In this case, if x is far from z, then |⟨x|U(t)|z⟩| is small albeit nonzero. Namely, although the ideal CTQW starting at z can explore the region far from z in this case, the chance of it ending up in this region is quite small. Both the ideal CTQW and its approximation can only explore the connected component of G that the seed lies in. Therefore, to fully explore the domain F, it is necessary to run U(t) or U'(t) on k different seeds, one from $F_1$, $F_2, \ldots, F_k$ each. This strategy is efficient because by assumption k=poly (n).

Optimizing the Parameters

Finally, the parameters t and θ need to be tuned to maximize the probability of obtaining high-quality solutions from $U_\theta(t)|z\rangle = e^{iA_\theta t}|z\rangle$ ), where the subscript θ is added to A and U to emphasize their dependence on θ. This is accomplished via CVaR minimization. Specifically, a measurement on $U_\theta(t)|z\rangle$ in the computational basis yields a random solution $X_{t,\theta}$ in F such that $$\mathbb{P}[X_{t,\theta}=x] = |\langle x|U_\theta(t)|z\rangle|^2, \forall x \in F.$$

Then t and θ are set to be the solution of the following problem:

$$\min_{t,\theta \in \mathbb{R}} CVaR_\alpha(f(X_{t,\theta}))$$

This is done by an iterative algorithm in which each evaluation of $$\underset{\alpha}{CVaR}(f(X_{t,\theta}))$$

requires to run the CTQW on a quantum device or to simulate it on a classical computer. Note that when α=1, then $$\underset{\alpha}{CVaR}(f(X_{t,\theta})) = \mathbb{E}[f(X_{t,beta})].$$

In this case, the average cost is simply minimized for a random solution $X_{t,\theta}$ sampled from $U_\theta(t)|z\rangle$. The optimal choice of a depends on $f$ and $z$. In these experiments, α=0.5 is set. This leads to satisfactory performance.

Max 3SAT

In the MAX 3SAT problem, m disjunctive clauses are given over n Boolean variables, where each clause contains at most 3 literals, and need to find a variable assignment that maximizes the number of satisfied clauses. The consider the weighted version of Max 3SAT is considered, where each clause is assigned a nonnegative weight and the goal is to maximize the total weight of satisfied clauses.

Formally, given an instance of Max 3SAT over n variables $x_1, x_2, \ldots, x_n$, then n+1 auxiliary variables $x_0, x_{n+1}, x_{n+2}, \ldots, x_{2n}$ are introduced. A valid assignment $x=(x_0, x_1, \ldots, x_{2n})$ is a 0-1 vector such that $x_0=0$ and $x_{n+i}=\neg x_i$ for $i=1,2,\ldots,n$. Then every clause with at most 3 literals can be written as $x_i \lor x_j \lor x_k$ for some $0 \le i \le j \le k \le 2n$, and it is satisfied by x if and only if at least one of $x_i$, $x_j$ and $x_k$ is assigned the value 1. The label (i, j, k) is the clause $x_i \lor x_j \lor x_k$. Note that i=0 means that this clause has effective length 2, 1 or even 0. Let $\mathcal{C}$ be the set of the labels of the clauses in a Max 3SAT instance, and for any $(i, j, k) \in \mathcal{C}$, let $w_{i,j,k}$ be the weight of the clause $x_i \lor x_j \lor x_k$ in the instance. A valid assignment must be found $x=(x_0, x_1, \ldots, x_{2n})$ that maximizes weight $(x)um_{(i,j,k)\in} \mathcal{C} w_{i,j,k}(x_i \lor x_j \lor x_k)$.

No polynomial-time classical algorithm for Max 3SAT can achieve an approximation ratio exceeding 7/8, even when restricted to satisfiable instances of the problem in which each clause contains exactly three literals. Remarkably, Karloff and Zwick developed a classical algorithm that achieves this ratio on satisfiable instances, which is optimal. Furthermore, there is strong evidence that their algorithm performs equally well on arbitrary Max 3SAT instances. So we use this algorithm to generate the seed for CBQOA.

The Karloff-Zwick algorithm is based on the following SDP relaxation of the Max 3SAT instance in which each variable $x_i$ is associated with a vector $v_i$ in the unit n-sphere $S^n$:

$$\max \sum_{(i,j,k) \in C} w_{i,j,k} z_{i,j,k},$$

subject to $$z_{i,j,k} \le \frac{4 - (v_0 + v_i) \cdot (v_j + v_k)}{4}, \forall (i, j, k) \in C,$$

$$z_{i,j,k} \le \frac{4 - (v_0 + v_j) \cdot (v_i + v_k)}{4}, \forall (i, j, k) \in C,$$

-continued $$z_{i,j,k} \le \frac{4 - (v_0 + v_k) \cdot (v_i + v_j)}{4}, \forall (i, j, k) \in C,$$

$$z_{i,j,k} \le 1, \forall (i, j, k) \in C,$$

$$v_i \cdot v_i = 1, \forall 0 \le i \le 2n,$$

$$v_i \cdot v_{n+i} = -1, \forall 1 \le i \le n.$$

This SDP can be solved in $\tilde{O}((|\mathcal{C}|+n)^{3.5})$ time by the latest interior point method. After receiving the solution $v_0, v_1, \ldots, v_{2n}$, the algorithm uses random hyperplane rounding to convert these vectors to a truth assignment to $x_1, x_2, \ldots, x_n$. Specifically, this procedure works as follows:
1. Pick a random vector $v \in S^n$ (or alternatively, chooses a random vector v with n-dimensional standard normal distribution).
2. For each $i \in [n]$, the variable $x_i$ is assigned value 1 if $(v \cdot v_i)(v \cdot v_0) \ge 0$, and 0 otherwise.

Designing and Implementing the CTQW

In Max 3SAT, the domain is $F=\{0,1\}^n$ and the cost function is $f: \{0,1\}^n \to \mathbb{R}$ such that $f(x)=\Sigma_{(i,j,k)\in} \mathcal{C} w_{i,j,k} [(1-x_i)(1-x_k)-1]$ (recall that $x_{n+i}=1-x_i$ each $i \in [n]$). Suppose z is a solution produced by the Karloff-Zwick algorithm. As mentioned in a prior section, $\mathcal{T}=\{\tau_1, \tau_2, \ldots, \tau_n\}$ is defined, where $\tau_i(x)=(x_1, \ldots, x_{i-1}, \neg x_i, x_{i+1}, \ldots, x_n)$ for all $x \in \{0,1\}^n$. Namely, x flips the i-th bit of the input string. Then the term $H_i$ corresponding to $\tau_i$ is $H_i=X_i$, i.e. the Pauli X operator on the i-th qubit. It follows that $$A_\theta = \sum_{i=1}^{n} w_i(\theta) X_i,$$

where $$w_i(\theta) = \frac{1}{1 + e^{-\theta[f(z)-f(\tau_i(z))]}}$$

depends on a parameter θ. The corresponding graph G is a weighted n-dimensional hypercube, where two vertices x and y are connected if and only if their Hamming distance is 1. The CTQW on this graph is $$e^{iA_\theta t} = \bigotimes_{j=1}^{n} e^{iw_j(\theta)tX}$$

which can be implemented exactly by performing $e^{iw_j(\theta)tX}$ on the j-th qubit for $j=1,2,\ldots,n$ simultaneously.

Finishing the Circuit

In Max 3SAT, the cost function $f(x)=\Sigma_{(i,j,k)\in} \mathcal{C} w_{i,j,k}[1-x_i)(1-x_j)(1-x_k)-1]$ is a cubic polynomial in the variables $x_1, x_2, \ldots, x_n$. It is mapped to the n-qubit Ising Hamiltonian $$H_f = \sum_{(i,j,k) \in C} w_{i,j,k} \left[ \frac{1}{8}(I + B_i)(I + B_j)(I + B_k) - I \right],$$

where $B_i=Z_i$ if $i\leq n$ and $-Z_{i-n}$ otherwise. The phase separator $e^{-iH_f\gamma}$ can be implemented with $O(|\mathcal{E}|)$ elementary gates for arbitrary $\gamma\in\mathbb{R}$.

With the methods for generating of z and implementing $e^{iA_{\theta t}}$ and $e^{-iH_{f\gamma}}$ in hand, the CBQOA quantum circuit can be built for Max 3SAT. Then, the parameters ($\vec{\beta}$, $\vec{\gamma}$) are tuned as described further on.

Max Bisection

In the Max Bisection problem, a graph is provided for $G=(V, E, w)$ such that $|V|=n$ is even and $w: E\to\mathbb{R}$ assigns a weight to each edge, and need to find a subset $S\subset V$ such that $|S|=n/2$ and the total weight of the edges between S and Vt minus S is maximized. Namely, Max Bisection is almost the same as Max Cut, except that it has the extra constraint $|S|=|V\backslash S|$. Without loss of generality, $V=[n]$ will be assumed, going forward.

Generating the Seed

Despite the similarity between Max Cut and Max Bisection, one cannot directly use the Goemans-Williamson algorithm to solve the latter problem, because the cut found by this algorithm is not necessarily a bisection. Nevertheless, several variants of this algorithm have been proposed to overcome this obstacle. The Feige-Langberg algorithm may be used to generate the seed for CBQOA. This algorithm is simple and fast, and achieves approximation ratio 0.7017 which is satisfactory. Other polynomial-time classical algorithms may achieve higher approximation ratios than the Feige-Langberg algorithm. In particular, the Austrin algorithm achieves approximation ratio 0.8776, which is nearly optimal. However, these algorithms are slow in practice, because their time complexities are high-degree polynomials of the problem size. For this reason, the non-optimal but more practical Feige-Langberg algorithm was chosen as the seed generator for CBQOA.

The Feige-Langberg algorithm is based on the following SDP relaxation of the Max Bisection instance in which each vertex $i\in V$ is associated with a vector $v_i$ in the unit n-sphere $S^n$:

$$\max \frac{1}{2}\sum_{(i,j)\in E} w_{i,j}(1-v_i\cdot v_j),$$

subject to $$\sum_{1\leq i<j\leq n} v_i\cdot v_j = -n/2,$$

$$v_i\cdot v_i = 1, \forall 1\leq i\leq n.$$

This SDP can be solved in $\tilde{O}(n^{3.5})$ time by the latest interior point method [?]. After obtaining the solution $v_1, v_2, \ldots, v_n$, the algorithm uses a random projection, randomized rounding (RPR$^2$) procedure to convert these vectors to a bisection of the graph. Specifically, for arbitrary $s\in\mathbb{R}^+$, an s-linear function $f_s^*: \mathbb{R}\to[0,1]$ is defined as:

$$f_s^*(x) = \begin{cases} 0, & \forall x\leq -s; (34) \\ \frac{1}{2}+\frac{x}{2s}, & \forall x\in(-s, s); (35) \\ 1, & \forall x\geq s \end{cases}$$

Then the RPR$^2$ procedure works as follows:
1. Let $S=\emptyset$ and $s=0.605$.
2. Choose a random vector v with n-dimensional standard normal distribution.
3. For each $i\in V$, compute $x_i=v_i\cdot v$, and add i to S independently with probability $f_s^*(x_i)$.
4. Let $S_t$ be the larger of S and $V\backslash S$. For each $i\in S_t$, let $\zeta(i)=\sum_{j\in V\backslash S_t} w_{i,j}$. Suppose $S_t=\{i_1, i_2, \ldots, i_l\}$, where $\zeta(i_1)\geq\zeta(i_2)\geq\ldots\geq\zeta(i_l)$ for some $l\geq n/2$. Then the bisection will be $(\tilde{S}_t, V\backslash\tilde{S}_t)$, where $\tilde{S}_t=\{i_1, i_2, \ldots, i_{n/2}\}$.

Designing and Implementing the CTQW

In Max Bisection, the bisections are represented by the n-bit strings with Hamming weight n/2, and the domain is $$F = \{x\in\{0,1\}^n : \Sigma_{i=1}^n x_i = n/2\}.$$

The cost function is $f: F\to\mathbb{R}$ such that $f(x)=\Sigma_{(a,b)\in E}w_{a,b}(2x_ax_b-x_a-x_b)$. Since F is invariant under the permutation of the n bits, the aforementioned method can be used for to construct $\mathcal{T}$. Specifically, suppose $z\in F$ is a solution produced by the Feige-Langberg algorithm. Let T=supp (z), and let $\tilde{G}=([n], \tilde{E})$ be the complete bipartite graph between T and $T^c$, i.e., $\tilde{E}=\{(i, j): i\in T, j\in T^c\}$. This leads to $\mathcal{T}=\{\tau_{a,b}: a\in T, b\in T^c\}$, where $\tau_{a,b}$ waps the a-th and b-th bits of the input string. Namely, for arbitrary $x\in\{0,1\}^n$, $(\tau_{a,b}(x))_a=x_b$, $(\tau_{a,b}(x))_b=x_a$, and $(\tau_{a,b}(x))_c=x_c$ for all $c\in[n]\backslash\{a, b\}$. Then the term $H_{a,b}$ corresponding to $\tau_{a,b}$ is $$H_{a,b} = \sum_{x\in\{0,1\}^n: x_a\neq x_b} |\tau_{a,b}(x)\rangle\langle x| = \frac{1}{2}(X_aX_b+Y_aY_b),$$

where $X_a$ and $X_b$ are the Pauli X operators on the a-th qubit and b-th qubit, respectively, and similarly for $Y_a$ and $Y_b$. It follows that $$A_\theta = \sum_{a\in T}\sum_{b\in T^c} w_{a,b}(\theta)H_{a,b} = \frac{1}{2}\sum_{a\in T}\sum_{b\in T^c} w_{a,b}(\theta)(X_aX_b+Y_aY_b).$$

where $$w_{a,b}(\theta) = \frac{1}{1+e^{-\theta[f(z)-f(\tau_{a,b}(z))]}}$$

depends on a parameter $\theta$. Then the CTQW $e^{iA_\theta t}$ can be implemented approximately based on the equation:

$$e^{iA_\theta t} = \left[\prod_{a\in T}\prod_{b\in T^c} e^{iw_{a,b}(\theta)(X_aX_b+Y_aY_b)t/(2N)}\right]^N + O\left(\frac{t^2}{N}\right),$$

where each unitary operation $e^{iw_{a,b}(\theta)(X_aX_b+Y_aY_b)t/(2N)}$ can be implemented as an XY gate on the a-th and b-th qubits. The resultant circuit has $O(n^2N)$ depth. The order of terms can be changed the for $e^{iw_{a,b}(\theta)(X_aX_b+Y_aY_b)t/(2N)}$'s to reduce the circuit depth. Specifically, suppose $T=\{a_0, a_1, \ldots, a_{n/2-1}\}$ and $T^c=\{b_0, b_1, \ldots, b_{n/2-1}\}$. Let $R_k=\{(a_i, b_{i+k \bmod n/2}): 0\leq i\leq n/2-1\}$ for $k=0,1,\ldots,n/2-1$, then the equation is:

$$e^{iA\theta t} = \left[\prod_{k=0}^{n/2-1}\left(\prod_{(a,b)\in R_k} e^{iw_{a,b}(\theta)(X_aX_b+Y_aY_b)t/(2N)}\right)\right]^N + O\left(\frac{t^2}{N}\right).$$

Figure 7:
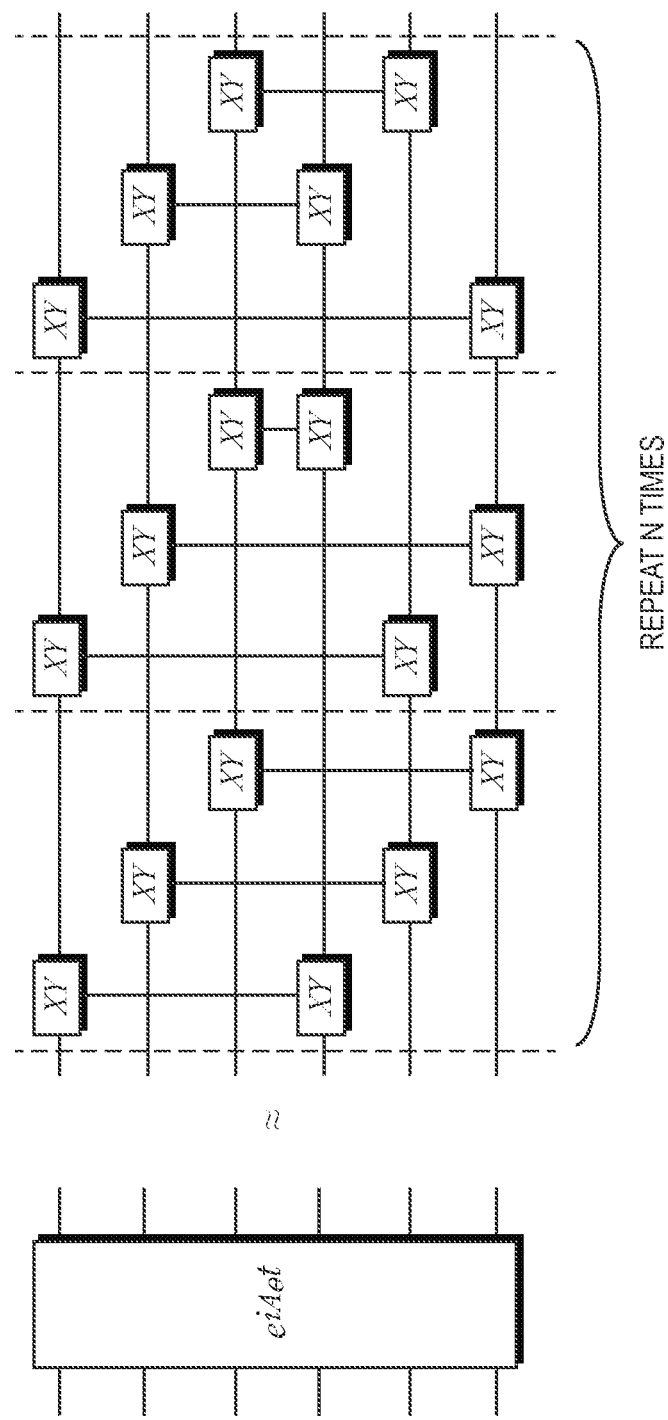
FIG. 7 shows a quantum circuit for approximately implementing the CTQW $e^{iA\theta t}$ for Max Bisection in the case n=6 and z=000111.

Since the unitary operations $\{e^{iw_{a,b}(\theta)(X_aX_b+Y_aY_b)t/(2N)}$: (a, b)$\in R_k\}$ act on disjoint qubits, both can be performed simultaneously. The resultant circuit has O (nN) depth. Referring to FIG. 7, a quantum circuit for illustrated for approximately implementing the CTQW $e^{iA\theta t}$ for Max Bisection in the case n=6 and z=000111. Here every two XY blocks connected by a vertical) line represent an XY gate (i.e., a unitary operation of the form $e^{i\phi(X\otimes X+Y\otimes Y)}$) on the two relevant qubits. This can be performed using the three XY gates within the same slice simultaneously, as they act on disjoint qubits. So the depth of each layer (which is shown here) is 3 instead of 9. There are N layers in the final circuit. Finally, the parameters t and θ may be tuned.

Finishing the Circuit

In Max Bisection, the cost function $f(x) = \Sigma_{(a,b)\in E} w_{a,b} (2x_a x_b - x_a - x_b)$ is a quadratic polynomial in the variables $x_1$, $x_2$, ..., $x_n$. It is mapped to the n-qubit Ising Hamiltonian $$H_f = \frac{1}{2}\sum_{(a,b)\in E} w_{a,b}(Z_aZ_b - I).$$

The phase separator $e^{-iH_f\gamma}$ can be implemented with |E| ZZ gates (i.e., unitary operations of the form $e^{i\phi Z\otimes Z}$) for arbitrary $\gamma\in\mathbb{R}$.

Equipped with the means to generate z and implement $e^{iA\theta t}$ and $e^{-iH_f\gamma}$, and embodiments of the present invention may build the CBQOA circuit for Max Bisection. Embodiments of the present invention may then optimize the parameters ($\vec{\beta}$, $\vec{\gamma}$).

Experimental Evaluation

In this section, the performance of CBQOA on Max 3SAT and Max Bisection is assessed. The Karloff-Zwick and Feige-Langberg algorithms are used to generate the seeds for CBQOA in these problems, respectively, and find that CBQOA yields better solutions than the seeds it receives with high probability. Moreover, the simulation results also indicate that CBQOA outperforms GM-QAOA on these problems.

Performance Metrics

Traditionally, the approximation ratio of a solution to an optimization problem is defined as the ratio of the objective value of this solution to that of the optimum solution. Namely, to maximize or minimize the objective function $f$: Fsubseteq$\{0,1\}^n\to\mathbb{R}$. The approximation ratio of a solution z$\in$F is often defined as $$\alpha(z)\frac{f(z)}{f(z^*)},$$

where $z^*\in$F is an optimum solution. However, if $f(z)$ can be positive or negative or zero, this definition is problematic and needs modification. Here, an alternative metric is introduced for measuring the quality of a solution z$\in$F:

$$\beta(z)\frac{\mathbb{E}_x[f(x)] - f(z)}{\mathbb{E}_x[f(x)] - f(z^*)},$$

where x is chosen uniformly at random from F. This metric is usable in all scenarios. One can see that β (z) measures to what extent z is better than a random guess. Note that β (z)≤1 for all z$\in$F, and the equality holds if and only if $f(z)=f(z^*)$. Moreover, β(z) can be negative, which happens if and only if z has lower quality than the average quality of a random guess. Finally, β(z) remains intact if it is replaced by c$f$+d for arbitrary c$\in\mathbb{R}^+$ and d$\in\mathbb{R}$. This is consistent with the intuition that the quality of a solution z$\in$F should remain invariant under such transformations of the objective function, where all β(z) the approximation ratio of a solution z$\in$F.

Given a classical or quantum algorithm $\mathcal{A}$ for solving an optimization problem, performance is measured by the probability of it producing "good" solutions. A solution z$\in$F is defined as good if its approximation ratio t$\alpha$(z) exceeds certain threshold. Formally, let POGS$_x(\mathcal{A}$) be the probability of $\mathcal{A}$ producing a solution z$\in$F such that β(z)≥x, where x$\in(-\infty,1]$ is the threshold for the approximation ratio. Here POGS is short for probability of good solutions. Furthermore, $\mathcal{A}$ can be repeated multiple times and reduce the failure probability (i.e., the probability of not receiving a good solution) exponentially. Namely, let $\mathcal{A}^k$ denote the event that $\mathcal{A}$ is run k times independently, obtain k solutions, and pick the best one of them. Thus, $$POGS_x(\mathcal{A}^k) = 1 - \left(1 - POGS_x(\mathcal{A})\right)^k.$$

Experimental Setup

For convenience, KZ and FL are used to denote the Karloff-Zwick and Feige-Lanberg algorithms, respectively, and use $$GM - QAOA_p$$

and $$CBQOA_p$$

to denote the p-layer GM-QAOA and p-layer CBQOA algorithms, respectively.

The procedure focuses on the hard instances of Max 3SAT and Max Bisection on which KZ and FL do not perform well and check to what extent CBQOA enhances the outputs of these classical algorithms. Moreover, the performance of GM-QAOA and CBQOA are compared for these instances.

Specifically, 100 hard Max 3SAT instances are generated as follows. First, come the creation of a random Max 3SAT instance with 16 variables and 200 clauses, and the assignment of a uniformly random weight between 0 and 1 to each clause independently. Then comes solving the Karloff- Zwick SDP for this instance, and performing the random hyperplane rounding on the solution 10000 times, receiving 10000 variable assignments. Then the fraction of the variable assignments with approximation ratios at least 0.7 is an accurate estimate of $POGS_{0.7}$ (KZ) with high probability. If this quantity is smaller than 0.05, then this Max 3SAT instance is deemed hard and added to the benchmark set. This process until 100 such instances are collected.

Similarly, 100 hard Max Bisection instances are generated as follows. First, come the generation of an Erdős-Rényi random graph G (n, p) with n=12 vertices and edge probability p=0.5, and assigning a uniformly random weight between −1 and 1 to each edge independently. Next comes solving Feige-Langberg SDP for this instance, and performing the $RPR^2$ procedure on the solution 10000 times, receiving 10000 bisections. Then the fraction of the bisections with approximation ratios at least 0.99 is an accurate estimate of $POGS_{0.99}$ (FL) with high probability. If this quantity is smaller than 0.05, then this Max Bisection instance is deemed hard and added to our benchmark set. The process is repeated until 100 such instances are gathered.

In CBQOA, KZ and FL are used to generate the seeds for Max 3SAT and Max Bisection, respectively. The CTQW for Max 3SAT is implemented as previously discussed and implemented the CTQW for Max Bisection approximately as described previously, setting N=3 for the latter. Parameters θ and t are tuned using the CVaR previously mentioned, setting α=0.5. Finally, the parameters ($\vec{\beta}, \vec{\gamma}$) are optimized, again setting α=0.5. During this procedure, a technique is used to accelerate the classical simulation of CBQOA circuits, setting M=1000 (which leads to sufficiently accurate results). All the CVaR minimization problems were solved by the ADAM optimizer. All the simulations were conducted in the Orquestra® platform of Zapata Computing, Inc.

Simulation Results

Figure 8:
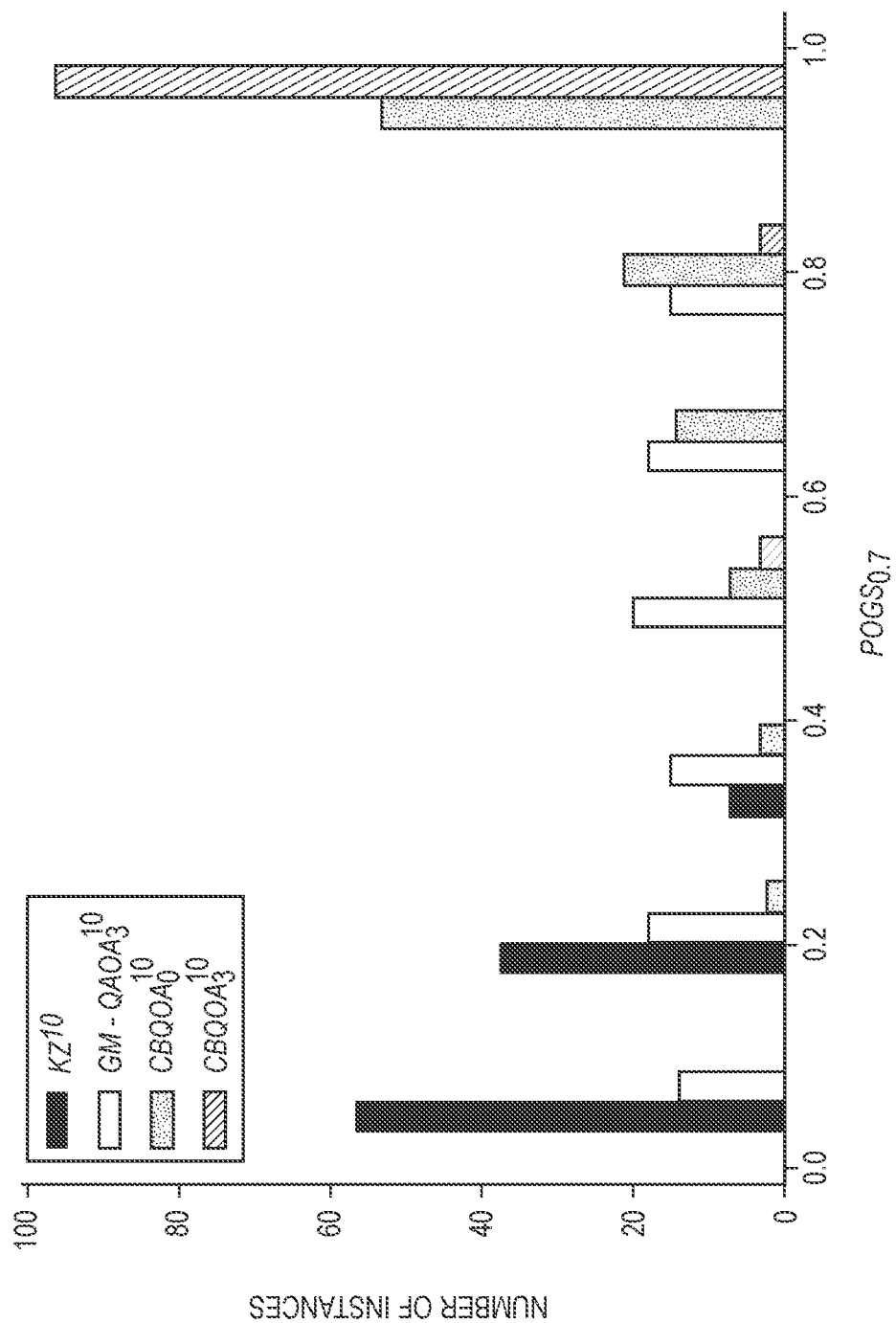
FIG. 8 illustrates the histograms of the $POGS_{0.7}$ of $KZ_{10}$, $GM-QAOA^{10}_3$, $CBQOA^{10}_0$ and $CBQOA^{10}_3$ on the 100 hard Max 3SAT instances.
Figure 9:
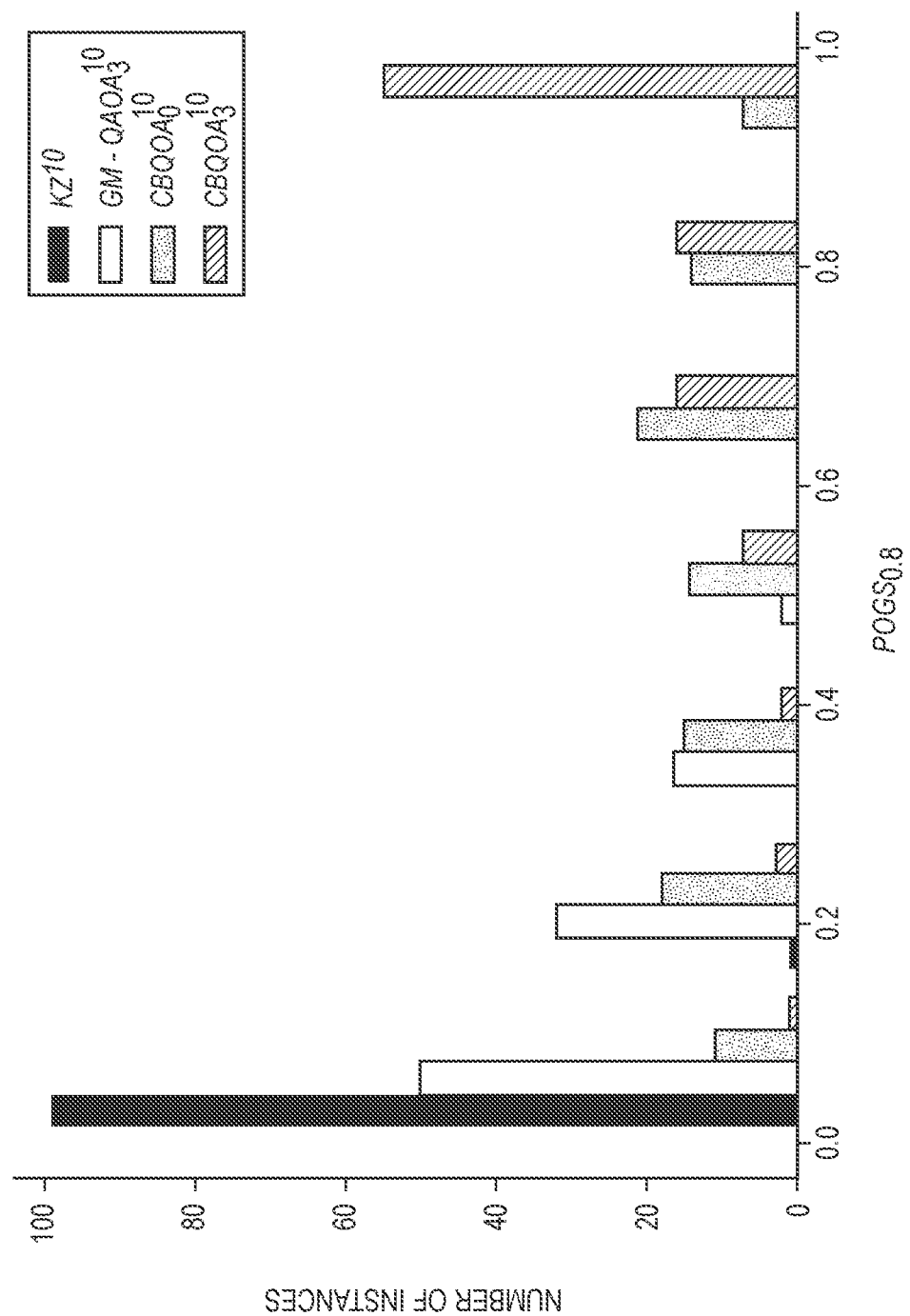
FIG. 9 illustrates the histograms of the and $POGS_{0.8}$ of $KZ_{10}$, $GM-QAOA^{10}_3$, $CBQOA^{10}_0$ and $CBQOA^{10}_3$ on the 100 hard Max 3SAT instances.

FIG. 8 and FIG. 9 illustrate the histograms of the $POGS_{0.7}$ and $POGS_{0.8}$ of $KS_{10}$, $GM-QAOA^{10}_3$, $CBQOA^{10}_0$ and $CBQOA^{10}_3$ on the 100 hard Max 3SAT instances, respectively. $CBQOA_3$ performs the best among them. KZ rarely produces a solution with approximation ratio at least 0.8. However, its mediocre output and a properly-constructed CTQW enable $CBQOA_0$ to find such a solution with noticeable probability. Then this probability is significantly amplified in $CBQOA_3$ thanks to the 3 layers of phase separators and mixing operators in the circuit.

FIG. 8 and FIG. 9 also reveal that $GM-QAOA_3$ does not perform as well as $CBQOA_3$. In fact, $GM-QAOA_3$ is even surpassed by $CBQOA_0$. Recall that GM-QAOA always starts with a uniform superposition of the feasible solutions (many of which have low qualities), while CBQOA starts with a non-uniform superposition of the feasible solutions in which the neighbors of the seed receive higher amplitudes than the others. As a consequence, the initial state of CBQOA has larger overlap with the states corresponding to the high-quality solutions than that of GM-QAOA, which means that CBQOA needs fewer layers than GM-QAOA to reach the same performance, as supported by the experimental data.

Figure 10:
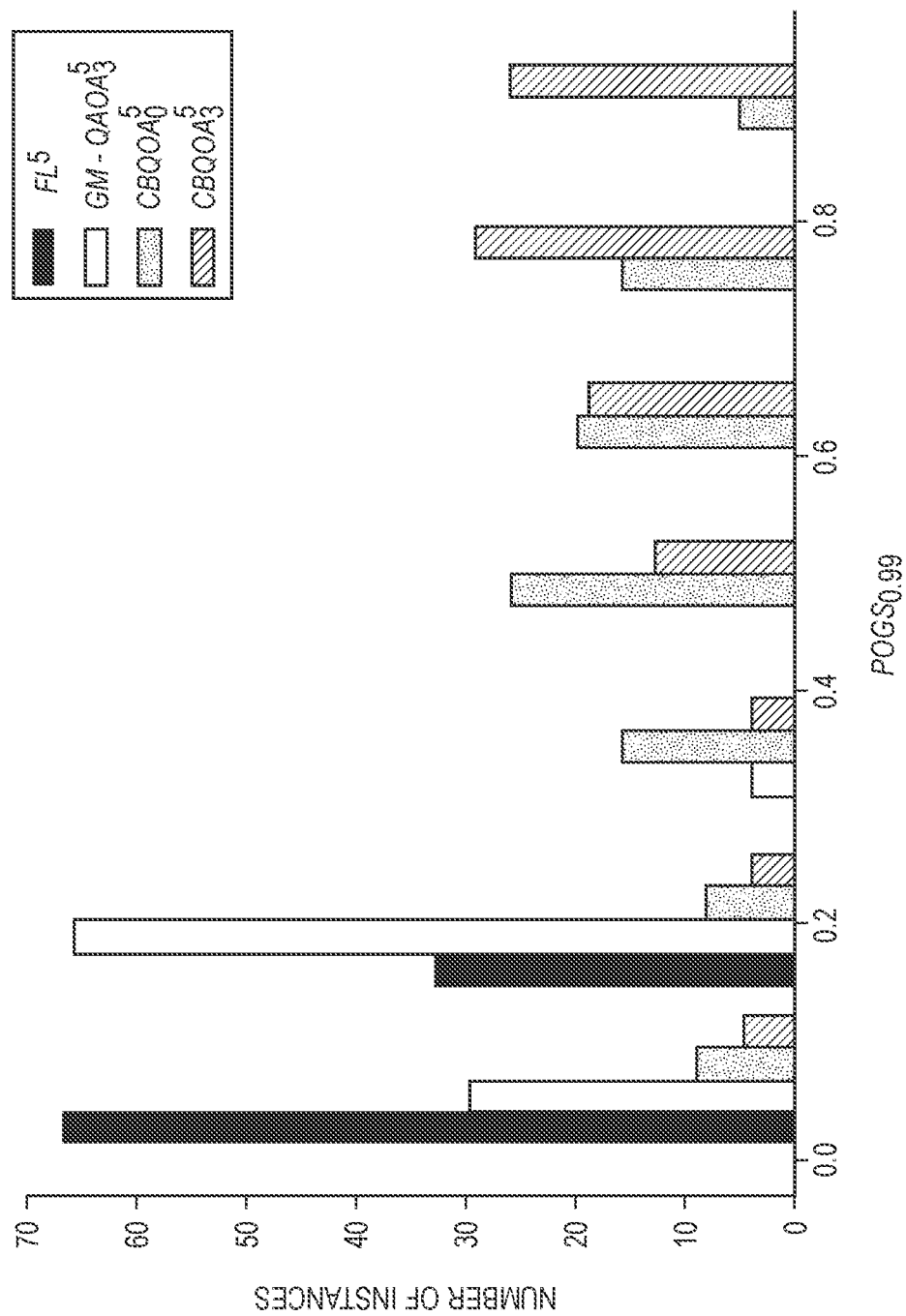
FIG. 10 illustrates the histograms of the $POGS_{0.99}$ of $FL_5$, $GM-QAOA^5_3$, $CBQOA^5_0$ and $CBQOA^5_3$ on the 100 hard Max Bisections instances.

FIG. 10 illustrates the histograms of the $POGS_{0.99}$ of $FL_5$, $GM-QAOA^5_3$, $CBQOA^5_0$ and $CBQOA^5_3$ on the 100 hard Max Bisections instances. One can see that $CBQOA_3$ performs the best among them. Specifically, FL struggles to produce a solution with approximation ratio at least 0.99. But with the help of its output and an appropriate CTQW, $CBQOA_0$ finds such a solution with decent chance. Then $CBQOA_3$ uses a 3-layer amplitude-amplification-like circuit to greatly boost this probability. Meanwhile, $GM-QAOA_3$ is again surpassed by $CBQOA_3$, for a reason similar to the one above for Max 3SAT.

Figure 11:
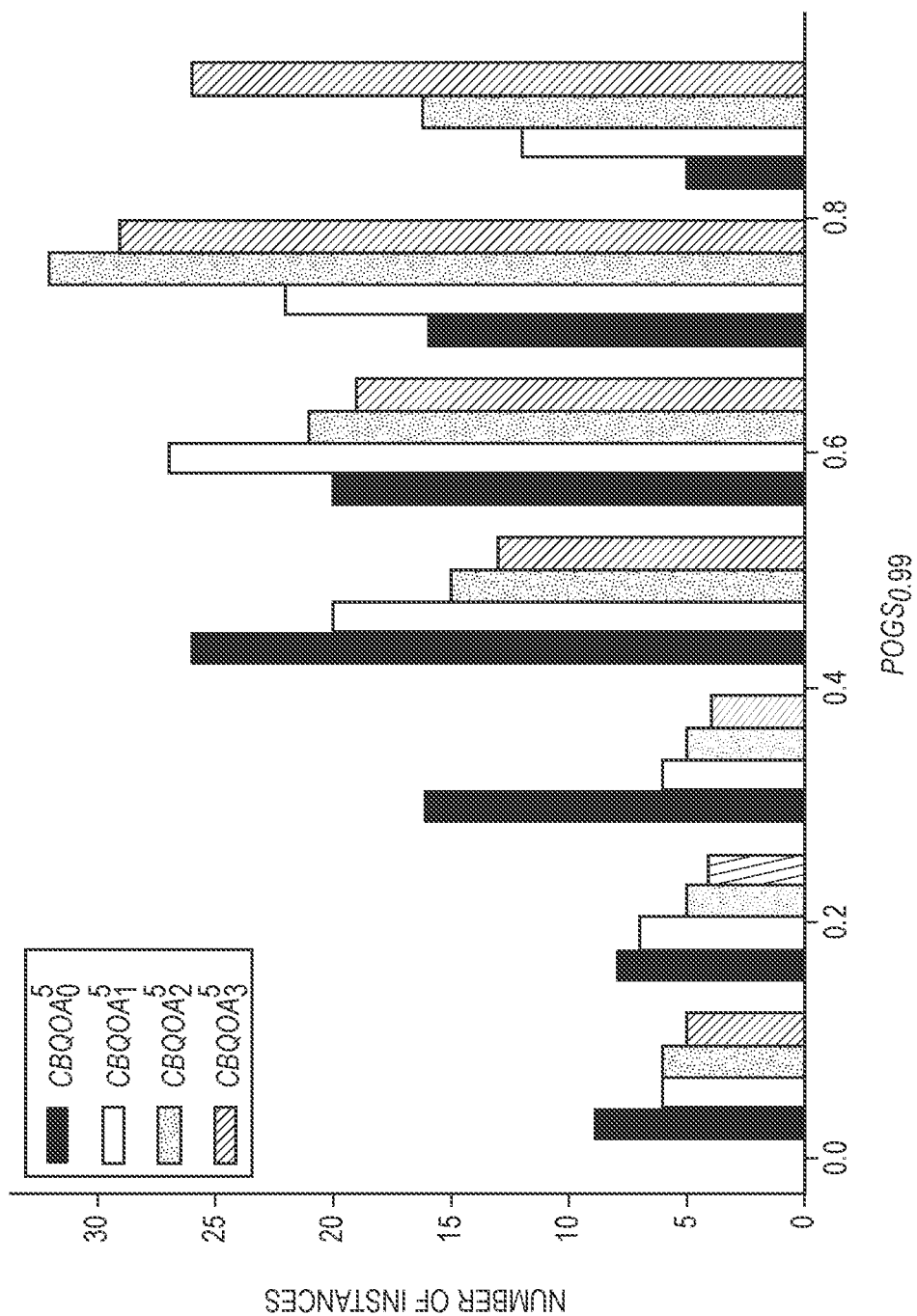
FIG. 11 illustrates the histograms of the $POGS_{0.99}$ of $FL_5$, $GM-QAOA^5_3$, $CBQOA^5_0$ and $CBQOA^5_3$ on the 100 hard Max Bisections instances.

FIG. 11 illustrates the histograms of the $POGS_{0.99}$ of $CBQOA^5_p$ for p=0,1,2,3 on the 100 hard Max Bisection instances. Again, deeper circuits yield better results. However, as p grows large, increasing it further leads to diminishing returns while making the parameter tuning more difficult and time-consuming. It should be chosen appropriately to achieve a balance between the efficiency of the algorithm and the quality of its output.

To summarize, the disclosed technology includes a hybrid quantum-classical method for solving a broad class of combinatorial optimization problems. The method includes a CBQOA algorithm using an approximate solution produced by a classical algorithm and a CTQW on a properly-constructed graph to create a suitable superposition of the feasible solutions which is then processed. This algorithm has advantages over prior methods in that it solves constrained problems without modifying their cost functions, confines the evolution of the quantum state to the feasible subspace, and does not rely on efficient indexing of the feasible solutions as some previous method demands. Useful algorithms for addressing combinatorial optimization problems delegate subtasks between classical and quantum components in order to achieve the highest overall performance.

Currently, a classical approximation algorithm is used to generate the seed for CBQOA. Ideally, it is desirable to find a solution z that is close in subspace to a large number of high-quality solutions, so that the state $|\psi\rangle = e^{iAt}|z\rangle$ has large overlap with the states corresponding to those solutions for some appropriate t. It is the distances between z and the high-quality solutions, not the value of $f(z)$, that plays a significant role in CBQOA.

For CBQOA to be practical, the parameter tuning process should be made as efficient as possible. So far, a general-purpose iterative optimizer has been used to tune the parameters (i.e., t, θ, $\vec{\beta}$ and $\vec{\gamma}$), in which each iteration requires to run the CBQOA circuit on a quantum device.

In one embodiment of the disclosed technology, a method is disclosed, performed on a hybrid quantum-classical computer system, for finding a problem solution to a combinatorial optimization problem. The hybrid quantum-classical computer system may comprise a classical computer and a quantum computer. The classical computer may include a processor, a non-transitory computer readable medium, and computer instructions stored in the non-transitory computer readable medium. The quantum computer may include a quantum component, having a plurality of qubits, which accepts a sequence of instructions to evolve a quantum state based on a series of quantum gates. Computer instructions, when executed by the processor, perform a method including defining a combinatorial optimization problem to be solved, having a domain F. A classical optimization algorithm may be used as a pre-processor to select an approximate solution or seed.

In one aspect, a quantum state is evolved in a quantum circuit based on the seed approximate solution. An undirected graph is generated that connects with feasible solutions. Using continuous-time quantum walk (CTQW), a search may be conducted for feasible solutions in the subspace neighborhood of the seed. Also, in one aspect, the method may include using an iterative optimizer for tuning the quantum circuit parameters to maximize the probability of obtaining feasible solutions having a cost function minimum. In another aspect, CBQOA quantum circuit is run with and the final state is measured in the computational basis solution to obtain the smallest cost function output as a result, providing the enhanced problem solution.

In another aspect, the CBQOA quantum circuit is run with optimal parameters. The final state is measured in the computational basis to obtain the smallest cost function output as a result, thereby providing the enhanced problem solution.

In another aspect, the enhanced problem solution is more precise than the seed received from the classical algorithm. The seed may be generated by a variational quantum algorithm of several known kinds. In another embodiment, the seed is chosen to find a feasible solution in polynomial time. The classical algorithm may be of different types. The classical algorithm may be based on simulated annealing. The classical algorithm may be based on semi-definite programming. The classical algorithm may be based on spectral graph theory.

In another embodiment, the problem solved is a Max Bisection problem. Also, the problem solved may be a Max Independent Set problem. In and out of their embodiment, the problem solved may be a Max 3SAT problem.

In another embodiment, the problem solved may be a Portfolio Optimization problem. Also, the problem solved may be a Traveling Salesperson problem. In another aspect, the problem solved may be a constrained problem without modifying its cost function. In one aspect, the solution may be provided where indexing of feasible solutions is not required.

In another embodiment of the disclosed technology, a hybrid quantum-classical computer system is provided for finding a problem solution to a combinatorial optimization problem. The hybrid quantum-classical computer system includes a classical computer and a quantum computer. The classical computer includes a processor, a non-transitory computer readable medium, and computer instructions stored in the non-transitory computer readable medium. The quantum computer includes a quantum component, having a plurality of qubits, which accepts a sequence of instructions to evolve a quantum state based on a series of quantum gates. The computer instructions, when executed by the processor, perform the method. The method includes: defining the combinatorial optimization problem to be solved, the combinatorial optimization problem having a domain F; using a classical optimization algorithm on the classical computer as a pre-processor, selecting an approximate solution; evolving, based on the approximate solution, a quantum state in a quantum circuit on the quantum computer; generating an undirected graph to connect feasible solutions to the combinatorial optimization problem; using continuous-time quantum walk (CTQW), searching a subspace neighborhood of the seed, thereby finding a plurality of feasible solutions to the combinatorial optimization problem; using an iterative optimizer, tuning parameters of the quantum circuit, thereby producing optimal parameters of the quantum circuit. Tuning the parameters of the quantum circuit includes: running the quantum circuit with the parameters of the quantum circuit; measuring the final state of the quantum circuit in the computational basis; and tuning the parameters of the quantum circuit to maximize a probability of obtaining feasible solutions having a cost function minimum, thereby obtaining the smallest cost function output as a result corresponding to the enhanced problem solution.

The enhanced problem solution may be more precise than the seed received from the classical optimization algorithm. Selecting the approximate solution may include generating the approximate solution by a variational quantum algorithm. Selecting the approximate solution may include selecting the approximate solution such that the iterative optimizer tunes the parameters of the quantum circuit in polynomial time. The classical optimization algorithm may select the approximate solution using simulated annealing. The classical optimization algorithm may select the approximate solution using semi-definite programming. The classical optimization algorithm may select the approximate solution using spectral graph theory.

The combinatorial optimization problem may be a Max Bisection problem, a Max Independent Set problem, a Max 3SAT problem, a Portfolio Optimization problem, or a Traveling Salesperson problem.

The combinatorial optimization problem may be a constrained problem without modifying its cost function.

Tuning the parameters of the quantum circuit may include tuning the parameters of the quantum circuit without indexing the plurality of feasible solutions.

The disclosed technology disclosed can be practiced as a system, method, device, product, computer readable media, or article of manufacture. One or more features of an implementation can be combined with the base implementation. Implementations that are not mutually exclusive are taught to be combinable. One or more features of an implementation can be combined with other implementations. This disclosure periodically reminds the user of these options. Omission from some implementations of recitations that repeat these options should not be taken as limiting the combinations taught in the preceding sections. These recitations are hereby incorporated forward by reference into each of the following implementations.

It is to be understood that although the invention has been described above in terms of particular embodiments, the foregoing embodiments are provided as illustrative only, and do not limit or define the scope of the invention. Various other embodiments, including but not limited to the following, are also within the scope of the claims. For example, elements and components described herein may be further divided into additional components or joined together to form fewer components for performing the same functions.

Various physical embodiments of a quantum computer are suitable for use according to the present disclosure. In general, the fundamental data storage unit in quantum computing is the quantum bit, or qubit. The qubit is a quantum-computing analog of a classical digital computer system bit. A classical bit is considered to occupy, at any given point in time, one of two possible states corresponding to the binary digits (bits) 0 or 1. By contrast, a qubit is implemented in hardware by a physical medium with quantum-mechanical characteristics. Such a medium, which physically instantiates a qubit, may be referred to herein as a "physical instantiation of a qubit," a "physical embodiment of a qubit," a "medium embodying a qubit," or similar terms, or simply as a "qubit," for ease of explanation. It should be understood, therefore, that references herein to "qubits" within descriptions of embodiments of the present invention refer to physical media which embody qubits.

Each qubit has an infinite number of different potential quantum-mechanical states. When the state of a qubit is physically measured, the measurement produces one of two different basis states resolved from the state of the qubit. Thus, a single qubit can represent a one, a zero, or any quantum superposition of those two qubit states; a pair of qubits can be in any quantum superposition of 4 orthogonal basis states; and three qubits can be in any superposition of 8 orthogonal basis states. The function that defines the quantum-mechanical states of a qubit is known as its wavefunction. The wavefunction also specifies the probability distribution of outcomes for a given measurement. A qubit, which has a quantum state of dimension two (i.e., has two orthogonal basis states), may be generalized to a d-dimensional "qudit," where d may be any integral value, such as 2, 3, 4, or higher. In the general case of a qudit, measurement of the qudit produces one of d different basis states resolved from the state of the qudit. Any reference herein to a qubit should be understood to refer more generally to d-dimensional qudit with any value of d.

Although certain descriptions of qubits herein may describe such qubits in terms of their mathematical properties, each such qubit may be implemented in a physical medium in any of a variety of different ways. Examples of such physical media include superconducting material, trapped ions, photons, optical cavities, individual electrons trapped within quantum dots, point defects in solids (e.g., phosphorus donors in silicon or nitrogen-vacancy centers in diamond), molecules (e.g., alanine, vanadium complexes), or aggregations of any of the foregoing that exhibit qubit behavior, that is, comprising quantum states and transitions therebetween that can be controllably induced or detected.

For any given medium that implements a qubit, any of a variety of properties of that medium may be chosen to implement the qubit. For example, if electrons are chosen to implement qubits, then the x component of its spin degree of freedom may be chosen as the property of such electrons to represent the states of such qubits. Alternatively, the y component, or the z component of the spin degree of freedom may be chosen as the property of such electrons to represent the state of such qubits. This is merely a specific example of the general feature that for any physical medium that is chosen to implement qubits, there may be multiple physical degrees of freedom (e.g., the x, y, and z components in the electron spin example) that may be chosen to represent 0 and 1. For any particular degree of freedom, the physical medium may controllably be put in a state of superposition, and measurements may then be taken in the chosen degree of freedom to obtain readouts of qubit values.

Certain implementations of quantum computers, referred to as gate model quantum computers, comprise quantum gates. In contrast to classical gates, there is an infinite number of possible single-qubit quantum gates that change the state vector of a qubit. Changing the state of a qubit state vector typically is referred to as a single-qubit rotation, and may also be referred to herein as a state change or a single-qubit quantum-gate operation. A rotation, state change, or single-qubit quantum-gate operation may be represented mathematically by a unitary 2×2 matrix with complex elements. A rotation corresponds to a rotation of a qubit state within its Hilbert space, which may be conceptualized as a rotation of the Bloch sphere. (As is well-known to those having ordinary skill in the art, the Bloch sphere is a geometrical representation of the space of pure states of a qubit.) Multi-qubit gates alter the quantum state of a set of qubits. For example, two-qubit gates rotate the state of two qubits as a rotation in the four-dimensional Hilbert space of the two qubits. (As is well-known to those having ordinary skill in the art, a Hilbert space is an abstract vector space possessing the structure of an inner product that allows length and angle to be measured. Furthermore, Hilbert spaces are complete: there are enough limits in the space to allow the techniques of calculus to be used.)

A quantum circuit may be specified as a sequence of quantum gates. As described in more detail below, the term "quantum gate," as used herein, refers to the application of a gate control signal (defined below) to one or more qubits to cause those qubits to undergo certain physical transformations and thereby to implement a logical gate operation. To conceptualize a quantum circuit, the matrices corresponding to the component quantum gates may be multiplied together in the order specified by the gate sequence to produce a $2^n \times 2^n$ complex matrix representing the same overall state change on n qubits. A quantum circuit may thus be expressed as a single resultant operator. However, designing a quantum circuit in terms of constituent gates allows the design to conform to a standard set of gates, and thus enable greater ease of deployment. A quantum circuit thus corresponds to a design for actions taken upon the physical components of a quantum computer.

A given variational quantum circuit may be parameterized in a suitable device-specific manner. More generally, the quantum gates making up a quantum circuit may have an associated plurality of tuning parameters. For example, in embodiments based on optical switching, tuning parameters may correspond to the angles of individual optical elements.

In certain embodiments of quantum circuits, the quantum circuit includes both one or more gates and one or more measurement operations. Quantum computers implemented using such quantum circuits are referred to herein as implementing "measurement feedback." For example, a quantum computer implementing measurement feedback may execute the gates in a quantum circuit and then measure only a subset (i.e., fewer than all) of the qubits in the quantum computer, and then decide which gate(s) to execute next based on the outcome(s) of the measurement(s). In particular, the measurement(s) may indicate a degree of error in the gate operation(s), and the quantum computer may decide which gate(s) to execute next based on the degree of error. The quantum computer may then execute the gate(s) indicated by the decision. This process of executing gates, measuring a subset of the qubits, and then deciding which gate(s) to execute next may be repeated any number of times. Measurement feedback may be useful for performing quantum error correction, but is not limited to use in performing quantum error correction. For every quantum circuit, there is an error-corrected implementation of the circuit with or without measurement feedback.

Some embodiments described herein generate, measure, or utilize quantum states that approximate a target quantum state (e.g., a ground state of a Hamiltonian). As will be appreciated by those trained in the art, there are many ways to quantify how well a first quantum state "approximates" a second quantum state. In the following description, any concept or definition of approximation known in the art may be used without departing from the scope hereof. For example, when the first and second quantum states are represented as first and second vectors, respectively, the first quantum state approximates the second quantum state when an inner product between the first and second vectors (called the "fidelity" between the two quantum states) is greater than a predefined amount (typically labeled E). In this example, the fidelity quantifies how "close" or "similar" the first and second quantum states are to each other. The fidelity represents a probability that a measurement of the first quantum state will give the same result as if the measurement were performed on the second quantum state. Proximity between quantum states can also be quantified with a distance measure, such as a Euclidean norm, a Hamming distance, or another type of norm known in the art. Proximity between quantum states can also be defined in computational terms. For example, the first quantum state approximates the second quantum state when a polynomial time-sampling of the first quantum state gives some desired information or property that it shares with the second quantum state.

Not all quantum computers are gate model quantum computers. Embodiments of the present invention are not limited to being implemented using gate model quantum computers. As an alternative example, embodiments of the present invention may be implemented, in whole or in part, using a quantum computer that is implemented using a quantum annealing architecture, which is an alternative to the gate model quantum computing architecture. More specifically, quantum annealing (QA) is a metaheuristic for finding the global minimum of a given objective function over a given set of candidate solutions (candidate states), by a process using quantum fluctuations.

Figure 2A:
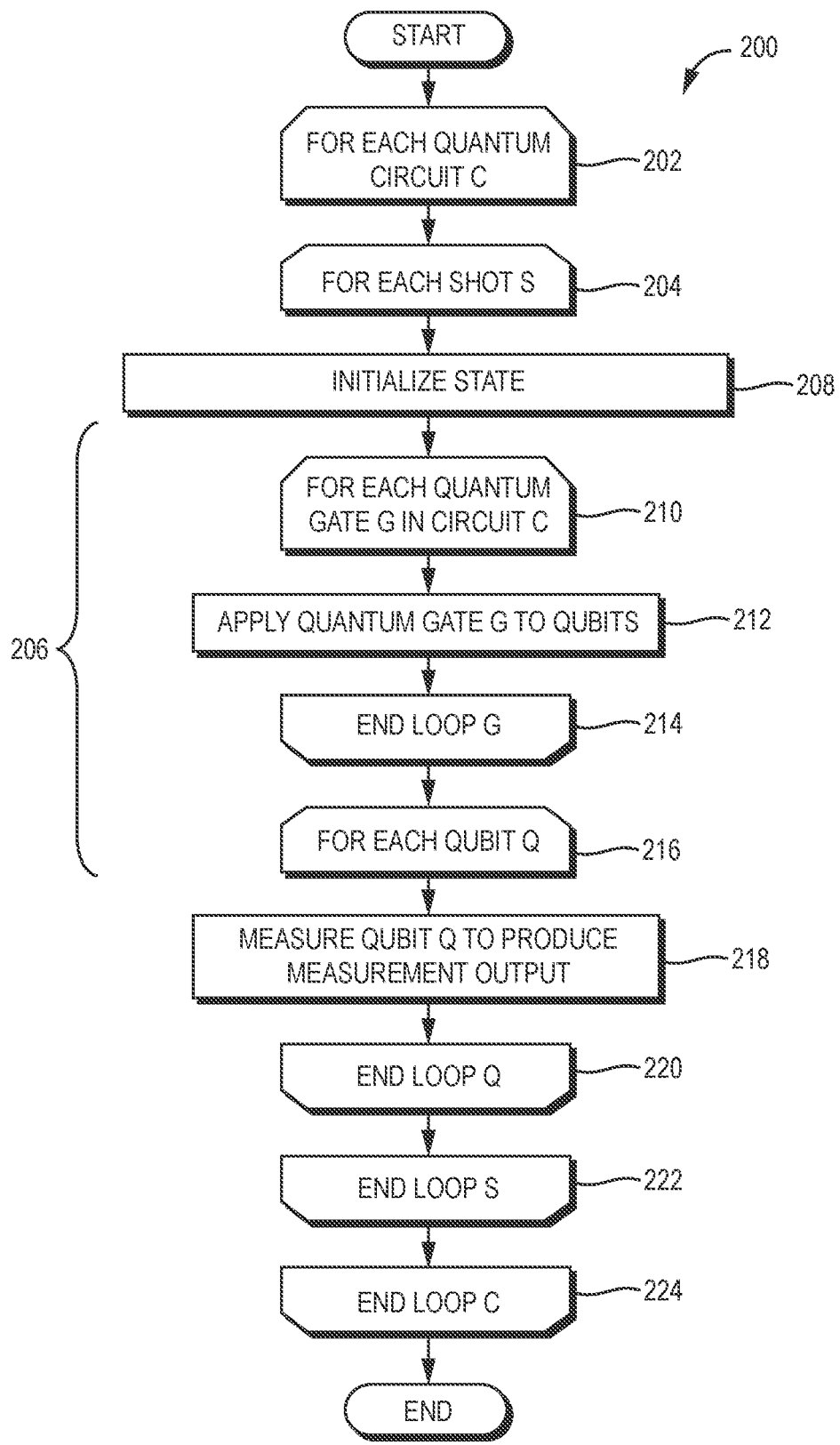
FIG. 2A is a flowchart of a method performed by the quantum computer of FIG. 1 according to one embodiment of the present invention.
Figure 2B:
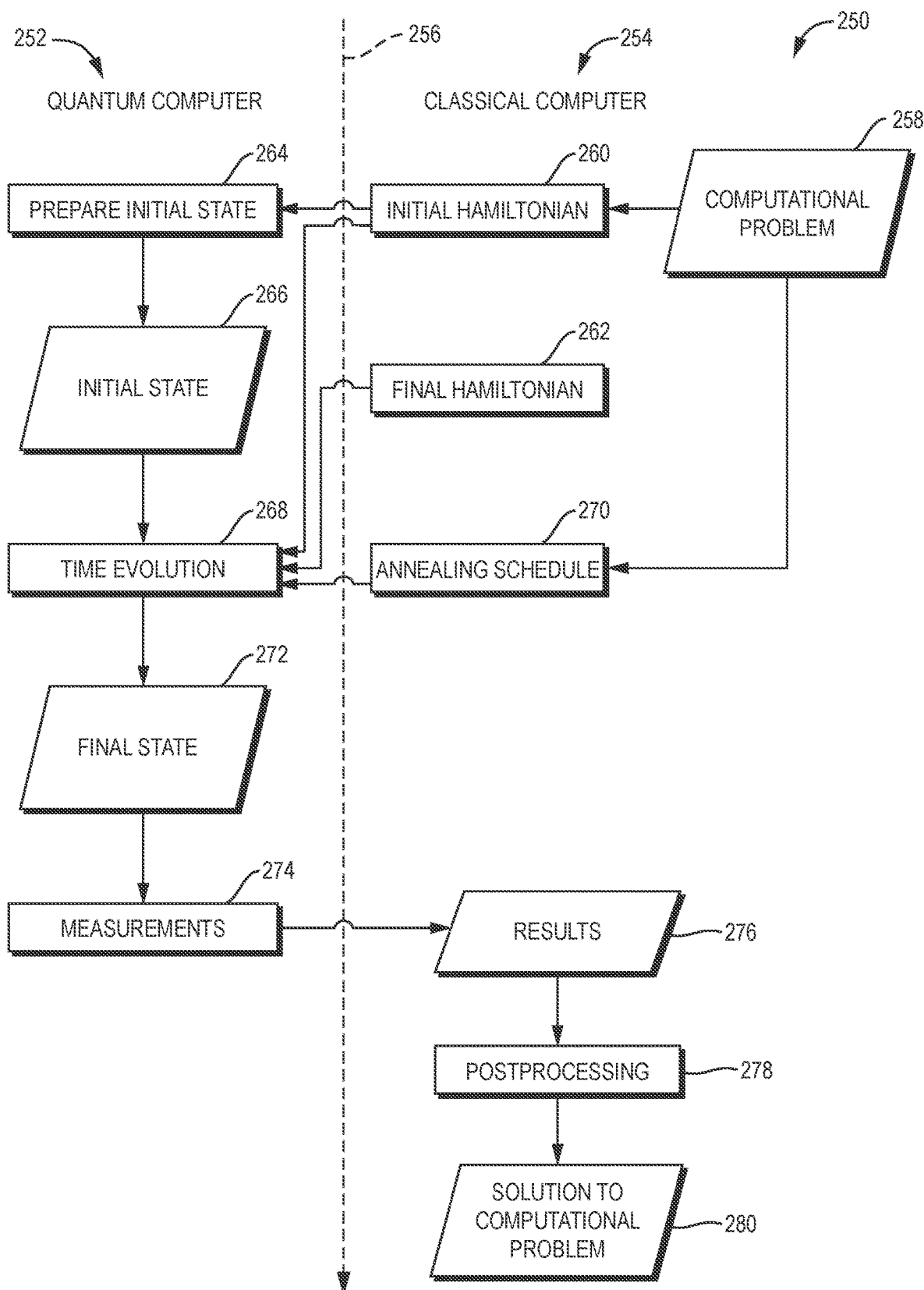
FIG. 2B is a diagram of a hybrid quantum-classical computer which performs quantum annealing according to one embodiment of the present invention.

FIG. 2B shows a diagram illustrating operations typically performed by a computer system 250 which implements quantum annealing. The system 250 includes both a quantum computer 252 and a classical computer 254. Operations shown on the left of the dashed vertical line 256 typically are performed by the quantum computer 252, while operations shown on the right of the dashed vertical line 256 typically are performed by the classical computer 254.

Quantum annealing starts with the classical computer 254 generating an initial Hamiltonian 260 and a final Hamiltonian 262 based on a computational problem 258 to be solved, and providing the initial Hamiltonian 260, the final Hamiltonian 262 and an annealing schedule 270 as input to the quantum computer 252. The quantum computer 252 prepares a well-known initial state 266 (FIG. 2B, operation 264), such as a quantum-mechanical superposition of all possible states (candidate states) with equal weights, based on the initial Hamiltonian 260. The classical computer 254 provides the initial Hamiltonian 260, a final Hamiltonian 262, and an annealing schedule 270 to the quantum computer 252. The quantum computer 252 starts in the initial state 266, and evolves its state according to the annealing schedule 270 following the time-dependent Schrodinger equation, a natural quantum-mechanical evolution of physical systems (FIG. 2B, operation 268). More specifically, the state of the quantum computer 252 undergoes time evolution under a time-dependent Hamiltonian, which starts from the initial Hamiltonian 260 and terminates at the final Hamiltonian 262. If the rate of change of the system Hamiltonian is slow enough, the system stays close to the ground state of the instantaneous Hamiltonian. If the rate of change of the system Hamiltonian is accelerated, the system may leave the ground state temporarily but produce a higher likelihood of concluding in the ground state of the final problem Hamiltonian, i.e., diabatic quantum computation. At the end of the time evolution, the set of qubits on the quantum annealer is in a final state 272, which is expected to be close to the ground state of the classical Ising model that corresponds to the solution to the original computational problem 258. An experimental demonstration of the success of quantum annealing for random magnets was reported immediately after the initial theoretical proposal.

The final state 272 of the quantum computer 252 is measured, thereby producing results 276 (i.e., measurements) (FIG. 2B, operation 274). The measurement operation 274 may be performed, for example, in any of the ways disclosed herein, such as in any of the ways disclosed herein in connection with the measurement unit 110 in FIG. 1. The classical computer 254 performs postprocessing on the measurement results 276 to produce output 280 representing a solution to the original computational problem 258 (FIG. 2B, operation 278).

As yet another alternative example, embodiments of the present invention may be implemented, in whole or in part, using a quantum computer that is implemented using a one-way quantum computing architecture, also referred to as a measurement-based quantum computing architecture, which is another alternative to the gate model quantum computing architecture. More specifically, the one-way or measurement based quantum computer (MBQC) is a method of quantum computing that first prepares an entangled resource state, usually a cluster state or graph state, then performs single qubit measurements on it. It is "one-way" because the resource state is destroyed by the measurements.

The outcome of each individual measurement is random, but they are related in such a way that the computation always succeeds. In general the choices of basis for later measurements need to depend on the results of earlier measurements, and hence the measurements cannot all be performed at the same time.

Any of the functions disclosed herein may be implemented using means for performing those functions. Such means include, but are not limited to, any of the components disclosed herein, such as the computer-related components described below.

Referring to FIG. 1, a diagram is shown of a system 100 implemented according to one embodiment of the present invention. Referring to FIG. 2A, a flowchart is shown of a method 200 performed by the system 100 of FIG. 1 according to one embodiment of the present invention. The system 100 includes a quantum computer 102. The quantum computer 102 includes a plurality of qubits 104, which may be implemented in any of the ways disclosed herein. There may be any number of qubits 104 in the quantum computer 102. For example, the qubits 104 may include or consist of no more than 2 qubits, no more than 4 qubits, no more than 8 qubits, no more than 16 qubits, no more than 32 qubits, no more than 64 qubits, no more than 128 qubits, no more than 256 qubits, no more than 512 qubits, no more than 1024 qubits, no more than 2048 qubits, no more than 4096 qubits, or no more than 8192 qubits. These are merely examples, in practice there may be any number of qubits 104 in the quantum computer 102.

There may be any number of gates in a quantum circuit. However, in some embodiments the number of gates may be at least proportional to the number of qubits 104 in the quantum computer 102. In some embodiments the gate depth may be no greater than the number of qubits 104 in the quantum computer 102, or no greater than some linear multiple of the number of qubits 104 in the quantum computer 102 (e.g., 2, 3, 4, 5, 6, or 7).

The qubits 104 may be interconnected in any graph pattern. For example, they be connected in a linear chain, a two-dimensional grid, an all-to-all connection, any combination thereof, or any subgraph of any of the preceding.

As will become clear from the description below, although element 102 is referred to herein as a "quantum computer," this does not imply that all components of the quantum computer 102 leverage quantum phenomena. One or more components of the quantum computer 102 may, for example, be classical (i.e., non-quantum components) components which do not leverage quantum phenomena.

The quantum computer 102 includes a control unit 106, which may include any of a variety of circuitry and/or other machinery for performing the functions disclosed herein. The control unit 106 may, for example, consist entirely of classical components. The control unit 106 generates and provides as output one or more control signals 108 to the qubits 104. The control signals 108 may take any of a variety of forms, such as any kind of electromagnetic signals, such as electrical signals, magnetic signals, optical signals (e.g., laser pulses), or any combination thereof.

For example:

In embodiments in which some or all of the qubits 104 are implemented as photons (also referred to as a "quantum optical" implementation) that travel along waveguides, the control unit 106 may be a beam splitter (e.g., a heater or a mirror), the control signals 108 may be signals that control the heater or the rotation of the mirror, the measurement unit 110 may be a photodetector, and the measurement signals 112 may be photons.

In embodiments in which some or all of the qubits 104 are implemented as charge type qubits (e.g., transmon, X-mon, G-mon) or flux-type qubits (e.g., flux qubits, capacitively shunted flux qubits) (also referred to as a "circuit quantum electrodynamic" (circuit QED) implementation), the control unit 106 may be a bus resonator activated by a drive, the control signals 108 may be cavity modes, the measurement unit 110 may be a second resonator (e.g., a low-Q resonator), and the measurement signals 112 may be voltages measured from the second resonator using dispersive readout techniques.

In embodiments in which some or all of the qubits 104 are implemented as superconducting circuits, the control unit 106 may be a circuit QED-assisted control unit or a direct capacitive coupling control unit or an inductive capacitive coupling control unit, the control signals 108 may be cavity modes, the measurement unit 110 may be a second resonator (e.g., a low-Q resonator), and the measurement signals 112 may be voltages measured from the second resonator using dispersive readout techniques.

In embodiments in which some or all of the qubits 104 are implemented as trapped ions (e.g., electronic states of, e.g., magnesium ions), the control unit 106 may be a laser, the control signals 108 may be laser pulses, the measurement unit 110 may be a laser and either a CCD or a photodetector (e.g., a photomultiplier tube), and the measurement signals 112 may be photons.

In embodiments in which some or all of the qubits 104 are implemented using nuclear magnetic resonance (NMR) (in which case the qubits may be molecules, e.g., in liquid or solid form), the control unit 106 may be a radio frequency (RF) antenna, the control signals 108 may be RF fields emitted by the RF antenna, the measurement unit 110 may be another RF antenna, and the measurement signals 112 may be RF fields measured by the second RF antenna.

In embodiments in which some or all of the qubits 104 are implemented as nitrogen-vacancy centers (NV centers), the control unit 106 may, for example, be a laser, a microwave antenna, or a coil, the control signals 108 may be visible light, a microwave signal, or a constant electromagnetic field, the measurement unit 110 may be a photodetector, and the measurement signals 112 may be photons.

In embodiments in which some or all of the qubits 104 are implemented as two-dimensional quasiparticles called "anyons" (also referred to as a "topological quantum computer" implementation), the control unit 106 may be nanowires, the control signals 108 may be local electrical fields or microwave pulses, the measurement unit 110 may be superconducting circuits, and the measurement signals 112 may be voltages.

In embodiments in which some or all of the qubits 104 are implemented as semiconducting material (e.g., nanowires), the control unit 106 may be microfabricated gates, the control signals 108 may be RF or microwave signals, the measurement unit 110 may be microfabricated gates, and the measurement signals 112 may be RF or microwave signals.

Although not shown explicitly in FIG. 1 and not required, the measurement unit 110 may provide one or more feedback signals 114 to the control unit 106 based on the measurement signals 112. For example, quantum computers referred to as "one-way quantum computers" or "measurement-based quantum computers" utilize such feedback signal 114 from the measurement unit 110 to the control unit 106. Such feedback signal 114 is also necessary for the operation of fault-tolerant quantum computing and error correction.

The control signals 108 may, for example, include one or more state preparation signals which, when received by the qubits 104, cause some or all of the qubits 104 to change their states. Such state preparation signals constitute a quantum circuit also referred to as an "ansatz circuit." The resulting state of the qubits 104 is referred to herein as an "initial state" or an "ansatz state." The process of outputting the state preparation signal(s) to cause the qubits 104 to be in their initial state is referred to herein as "state preparation" (FIG. 2A, section 206). A special case of state preparation is "initialization," also referred to as a "reset operation," in which the initial state is one in which some or all of the qubits 104 are in the "zero" state i.e. the default single-qubit state. More generally, state preparation may involve using the state preparation signals to cause some or all of the qubits 104 to be in any distribution of desired states. In some embodiments, the control unit 106 may first perform initialization on the qubits 104 and then perform preparation on the qubits 104, by first outputting a first set of state preparation signals to initialize the qubits 104, and by then outputting a second set of state preparation signals to put the qubits 104 partially or entirely into non-zero states.

Another example of control signals 108 that may be output by the control unit 106 and received by the qubits 104 are gate control signals. The control unit 106 may output such gate control signals, thereby applying one or more gates to the qubits 104. Applying a gate to one or more qubits causes the set of qubits to undergo a physical state change which embodies a corresponding logical gate operation (e.g., single-qubit rotation, two-qubit entangling gate or multi-qubit operation) specified by the received gate control signal. As this implies, in response to receiving the gate control signals, the qubits 104 undergo physical transformations which cause the qubits 104 to change state in such a way that the states of the qubits 104, when measured (see below), represent the results of performing logical gate operations specified by the gate control signals. The term "quantum gate," as used herein, refers to the application of a gate control signal to one or more qubits to cause those qubits to undergo the physical transformations described above and thereby to implement a logical gate operation.

It should be understood that the dividing line between state preparation (and the corresponding state preparation signals) and the application of gates (and the corresponding gate control signals) may be chosen arbitrarily. For example, some or all of the components and operations that are illustrated in FIGS. 1 and 2A-2B as elements of "state preparation" may instead be characterized as elements of gate application. Conversely, for example, some or all of the components and operations that are illustrated in FIGS. 1 and 2A-2B as elements of "gate application" may instead be characterized as elements of state preparation. As one particular example, the system and method of FIGS. 1 and 2A-2B may be characterized as solely performing state preparation followed by measurement, without any gate application, where the elements that are described herein as being part of gate application are instead considered to be part of state preparation. Conversely, for example, the system and method of FIGS. 1 and 2A-2B may be characterized as solely performing gate application followed by measurement, without any state preparation, and where the elements that are described herein as being part of state preparation are instead considered to be part of gate application.

The quantum computer 102 also includes a measurement unit 110, which performs one or more measurement operations on the qubits 104 to read out measurement signals 112 (also referred to herein as "measurement results") from the qubits 104, where the measurement results 112 are signals representing the states of some or all of the qubits 104. In practice, the control unit 106 and the measurement unit 110 may be entirely distinct from each other, or contain some components in common with each other, or be implemented using a single unit (i.e., a single unit may implement both the control unit 106 and the measurement unit 110). For example, a laser unit may be used both to generate the control signals 108 and to provide stimulus (e.g., one or more laser beams) to the qubits 104 to cause the measurement signals 112 to be generated.

In general, the quantum computer 102 may perform various operations described above any number of times. For example, the control unit 106 may generate one or more control signals 108, thereby causing the qubits 104 to perform one or more quantum gate operations. The measurement unit 110 may then perform one or more measurement operations on the qubits 104 to read out a set of one or more measurement signals 112. The measurement unit 110 may repeat such measurement operations on the qubits 104 before the control unit 106 generates additional control signals 108, thereby causing the measurement unit 110 to read out additional measurement signals 112 resulting from the same gate operations that were performed before reading out the previous measurement signals 112. The measurement unit 110 may repeat this process any number of times to generate any number of measurement signals 112 corresponding to the same gate operations. The quantum computer 102 may then aggregate such multiple measurements of the same gate operations in any of a variety of ways.

After the measurement unit 110 has performed one or more measurement operations on the qubits 104 after they have performed one set of gate operations, the control unit 106 may generate one or more additional control signals 108, which may differ from the previous control signals 108, thereby causing the qubits 104 to perform one or more additional quantum gate operations, which may differ from the previous set of quantum gate operations. The process described above may then be repeated, with the measurement unit 110 performing one or more measurement operations on the qubits 104 in their new states (resulting from the most recently-performed gate operations).

In general, the system 100 may implement a plurality of quantum circuits as follows. For each quantum circuit C in the plurality of quantum circuits (FIG. 2A, operation 202), the system 100 performs a plurality of "shots" on the qubits 104. The meaning of a shot will become clear from the description that follows. For each shot S in the plurality of shots (FIG. 2A, operation 204), the system 100 prepares the state of the qubits 104 (FIG. 2A, section 206). More specifically, for each quantum gate G in quantum circuit C (FIG. 2A, operation 210), the system 100 applies quantum gate G to the qubits 104 (FIG. 2A, operations 212 and 214).

Then, for each of the qubits Q 104 (FIG. 2A, operation 216), the system 100 measures the qubit Q to produce measurement output representing a current state of qubit Q (FIG. 2A, operations 218 and 220).

The operations described above are repeated for each shot S (FIG. 2A, operation 222), and circuit C (FIG. 2A, operation 224). As the description above implies, a single "shot" involves preparing the state of the qubits 104 and applying all of the quantum gates in a circuit to the qubits 104 and then measuring the states of the qubits 104; and the system 100 may perform multiple shots for one or more circuits.

Figure 3:
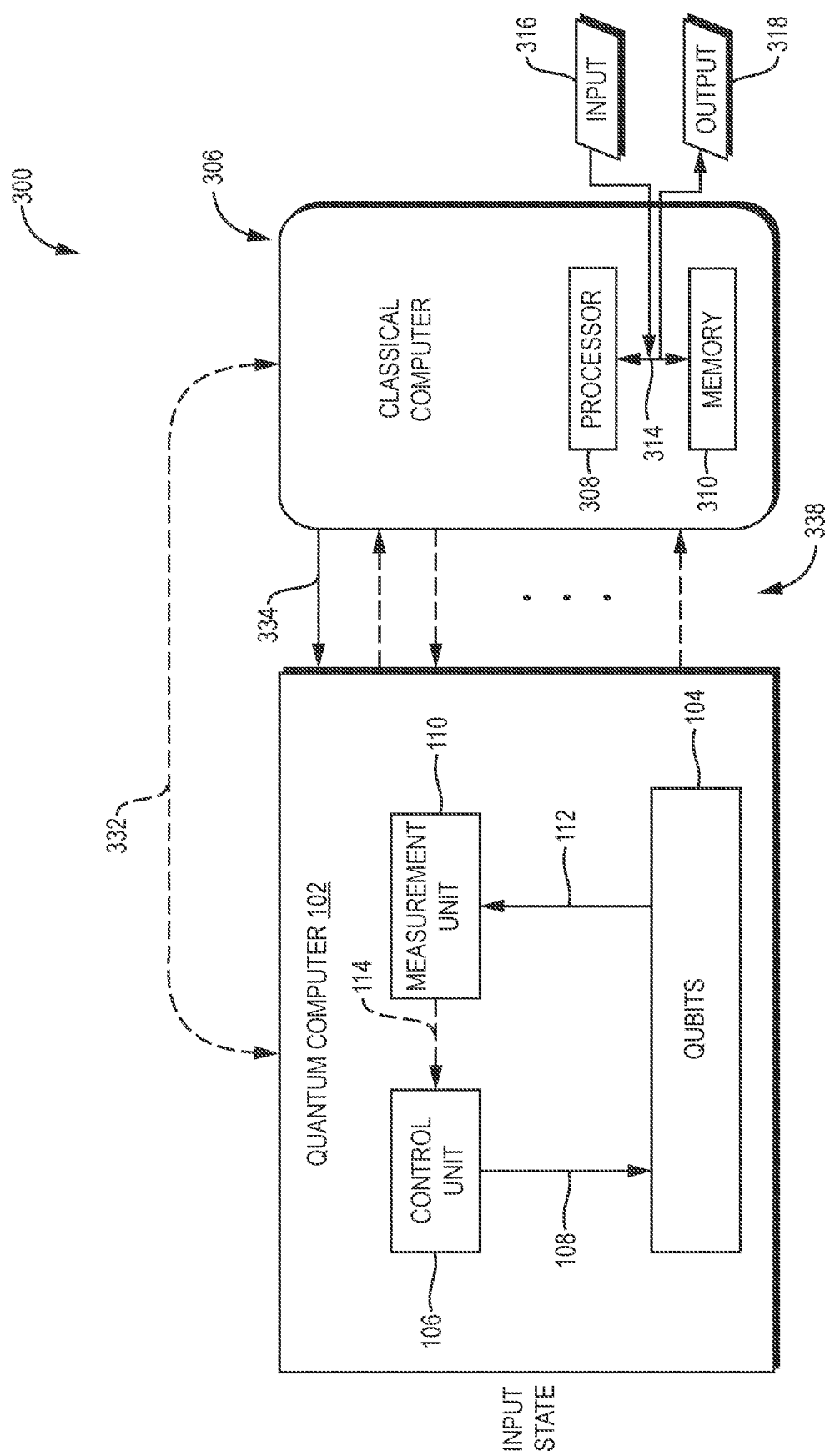
FIG. 3 is a diagram of a hybrid quantum-classical computer according to one embodiment of the present invention.

Referring to FIG. 3, a diagram is shown of a hybrid quantum-classical (HQC) computer 300 implemented according to one embodiment of the present invention. The HQC 300 includes a quantum computer component 102 (which may, for example, be implemented in the manner shown and described in connection with FIG. 1) and a classical computer component 306. The classical computer component may be a machine implemented according to the general computing model established by John Von Neumann, in which programs are written in the form of ordered lists of instructions and stored within a classical (e.g., digital) memory 310 and executed by a classical (e.g., digital) processor 308 of the classical computer. The memory 310 is classical in the sense that it stores data in a storage medium in the form of bits, which have a single definite binary state at any point in time. The bits stored in the memory 310 may, for example, represent a computer program. The classical computer component 304 typically includes a bus 314. The processor 308 may read bits from and write bits to the memory 310 over the bus 314. For example, the processor 308 may read instructions from the computer program in the memory 310, and may optionally receive input data 316 from a source external to the computer 302, such as from a user input device such as a mouse, keyboard, or any other input device. The processor 308 may use instructions that have been read from the memory 310 to perform computations on data read from the memory 310 and/or the input 316, and generate output from those instructions. The processor 308 may store that output back into the memory 310 and/or provide the output externally as output data 318 via an output device, such as a monitor, speaker, or network device.

The quantum computer component 102 may include a plurality of qubits 104, as described above in connection with FIG. 1. A single qubit may represent a one, a zero, or any quantum superposition of those two qubit states. The classical computer component 304 may provide classical state preparation signals 332 to the quantum computer 102, in response to which the quantum computer 102 may prepare the states of the qubits 104 in any of the ways disclosed herein, such as in any of the ways disclosed in connection with FIGS. 1 and 2A-2B.

Once the qubits 104 have been prepared, the classical processor 308 may provide classical control signals 334 to the quantum computer 102, in response to which the quantum computer 102 may apply the gate operations specified by the control signals 332 to the qubits 104, as a result of which the qubits 104 arrive at a final state. The measurement unit 110 in the quantum computer 102 (which may be implemented as described above in connection with FIGS. 1 and 2A-2B) may measure the states of the qubits 104 and produce measurement output 338 representing the collapse of the states of the qubits 104 into one of their eigenstates.

As a result, the measurement output 338 includes or consists of bits and therefore represents a classical state. The quantum computer 102 provides the measurement output 338 to the classical processor 308. The classical processor 308 may store data representing the measurement output 338 and/or data derived therefrom in the classical memory 310.

The steps described above may be repeated any number of times, with what is described above as the final state of the qubits 104 serving as the initial state of the next iteration. In this way, the classical computer 304 and the quantum computer 102 may cooperate as co-processors to perform joint computations as a single computer system.

Although certain functions may be described herein as being performed by a classical computer and other functions may be described herein as being performed by a quantum computer, these are merely examples and do not constitute limitations of the present invention. A subset of the functions which are disclosed herein as being performed by a quantum computer may instead be performed by a classical computer. For example, a classical computer may execute functionality for emulating a quantum computer and provide a subset of the functionality described herein, albeit with functionality limited by the exponential scaling of the simulation. Functions which are disclosed herein as being performed by a classical computer may instead be performed by a quantum computer.

The techniques described above may be implemented, for example, in hardware, in one or more computer programs tangibly stored on one or more computer-readable media, firmware, or any combination thereof, such as solely on a quantum computer, solely on a classical computer, or on a hybrid quantum-classical (HQC) computer. The techniques disclosed herein may, for example, be implemented solely on a classical computer, in which the classical computer emulates the quantum computer functions disclosed herein.

Any reference herein to the state $|0\rangle$ may alternatively refer to the state $|1\rangle$, and vice versa. In other words, any role described herein for the states $|0\rangle$ and $|1\rangle$ may be reversed within embodiments of the present invention. More generally, any computational basis state disclosed herein may be replaced with any suitable reference state within embodiments of the present invention.

The techniques described above may be implemented in one or more computer programs executing on (or executable by) a programmable computer (such as a classical computer, a quantum computer, or an HQC) including any combination of any number of the following: a processor, a storage medium readable and/or writable by the processor (including, for example, volatile and non-volatile memory and/or storage elements), an input device, and an output device. Program code may be applied to input entered using the input device to perform the functions described and to generate output using the output device.

Embodiments of the present invention include features which are only possible and/or feasible to implement with the use of one or more computers, computer processors, and/or other elements of a computer system. Such features are either impossible or impractical to implement mentally and/or manually. For example, embodiments of the present invention evolve a quantum state in a quantum circuit on a quantum computer. Such a function is inherently rooted in quantum computing technology and cannot be implemented mentally or manually.

Any claims herein which affirmatively require a computer, a processor, a memory, or similar computer-related elements, are intended to require such elements, and should not be interpreted as if such elements are not present in or required by such claims. Such claims are not intended, and should not be interpreted, to cover methods and/or systems which lack the recited computer-related elements. For example, any method claim herein which recites that the claimed method is performed by a computer, a processor, a memory, and/or similar computer-related element, is intended to, and should only be interpreted to, encompass methods which are performed by the recited computer-related element(s). Such a method claim should not be interpreted, for example, to encompass a method that is performed mentally or by hand (e.g., using pencil and paper). Similarly, any product claim herein which recites that the claimed product includes a computer, a processor, a memory, and/or similar computer-related element, is intended to, and should only be interpreted to, encompass products which include the recited computer-related element(s). Such a product claim should not be interpreted, for example, to encompass a product that does not include the recited computer-related element(s).

In embodiments in which a classical computing component executes a computer program providing any subset of the functionality within the scope of the claims below, the computer program may be implemented in any programming language, such as assembly language, machine language, a high-level procedural programming language, or an object-oriented programming language. The programming language may, for example, be a compiled or interpreted programming language.

Each such computer program may be implemented in a computer program product tangibly embodied in a machine-readable storage device for execution by a computer processor, which may be either a classical processor or a quantum processor. Method steps of the invention may be performed by one or more computer processors executing a program tangibly embodied on a computer-readable medium to perform functions of the invention by operating on input and generating output. Suitable processors include, by way of example, both general and special purpose microprocessors. Generally, the processor receives (reads) instructions and data from a memory (such as a read-only memory and/or a random access memory) and writes (stores) instructions and data to the memory. Storage devices suitable for tangibly embodying computer program instructions and data include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits) or FPGAs (Field-Programmable Gate Arrays). A classical computer can generally also receive (read) programs and data from, and write (store) programs and data to, a non-transitory computer-readable storage medium such as an internal disk (not shown) or a removable disk. These elements will also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium.

Any data disclosed herein may be implemented, for example, in one or more data structures tangibly stored on a non-transitory computer-readable medium (such as a classical computer-readable medium, a quantum computer-readable medium, or an HQC computer-readable medium).

Embodiments of the invention may store such data in such data structure(s) and read such data from such data structure(s).

Although terms such as "optimize" and "optimal" are used herein, in practice, embodiments of the present invention may include methods which produce outputs that are not optimal, or which are not known to be optimal, but which nevertheless are useful. For example, embodiments of the present invention may produce an output which approximates an optimal solution, within some degree of error. As a result, terms herein such as "optimize" and "optimal" should be understood to refer not only to processes which produce optimal outputs, but also processes which produce outputs that approximate an optimal solution, within some degree of error.

What is claimed is:

The invention claimed is:

1. A method, performed on a hybrid quantum-classical computer system, for finding an enhanced problem solution to a combinatorial optimization problem, the hybrid quantum-classical computer system comprising a classical computer and a quantum computer,
the classical computer including a processor, a non-transitory computer readable medium, and computer instructions stored in the non-transitory computer readable medium;
the quantum computer including a quantum component, having a plurality of qubits, which accepts a sequence of instructions to evolve a quantum state based on a series of quantum gates;
wherein the computer instructions, when executed by the processor, perform the method, the method comprising:
defining the combinatorial optimization problem to be solved, the combinatorial optimization problem having a domain F of feasible solutions;
using a classical optimization algorithm on the classical computer as a pre-processor, selecting a seed approximate solution belonging to the domain F;
evolving, based on the seed approximate solution, a quantum state in a quantum circuit on the quantum computer;
generating an undirected graph to connect the feasible solutions to the combinatorial optimization problem;
using continuous-time quantum walk (CTQW), searching a neighborhood of the seed approximate solution, thereby finding a superposition of the feasible solutions to the combinatorial optimization problem;
using an iterative optimizer, tuning parameters of the quantum circuit, thereby producing optimal parameters of the quantum circuit, comprising:
running the quantum circuit with the parameters of the quantum circuit;
measuring the final state of the quantum circuit in the computational basis; and
tuning the parameters of the quantum circuit to maximize a probability of obtaining feasible solutions having a cost function minimum, thereby obtaining the enhanced problem solution with a lower cost function value than the approximate solution seed.

2. The method of claim 1, wherein the enhanced problem solution is more precise than the seed approximate solution received from the classical optimization algorithm.

3. The method of claim 1, wherein selecting the seed approximate solution comprises generating the seed approximate solution by a variational quantum algorithm.

4. The method of claim 1, where selecting the seed approximate solution comprises selecting the seed approximate solution such that the iterative optimizer tunes the parameters of the quantum circuit in polynomial time.

5. The method of claim 1, wherein the classical optimization algorithm selects the seed approximate solution using simulated annealing.

6. The method of claim 1, wherein the classical optimization algorithm selects the seed approximate solution using semi-definite programming.

7. The method of claim 1, wherein the classical optimization algorithm selects the seed approximate solution using spectral graph theory.

8. The method of claim 1, wherein the combinatorial optimization problem comprises a Max Bisection problem.

9. The method of claim 1, wherein the combinatorial optimization problem comprises a Max Independent Set problem.

10. The method of claim 1, wherein the combinatorial optimization problem comprises a Max 3SAT problem.

11. The method of claim 1, wherein the combinatorial optimization problem comprises a Portfolio Optimization problem.

12. The method of claim 1, wherein the combinatorial optimization problem comprises a Traveling Salesperson problem.

13. The method of claim 1, wherein the combinatorial optimization problem comprises a constrained problem without modifying its cost function.

14. The method of claim 1, wherein tuning the parameters of the quantum circuit comprises tuning the parameters of the quantum circuit without indexing the feasible solutions.

15. A hybrid quantum-classical computer system for finding an enhanced problem solution to a combinatorial optimization problem, the hybrid quantum-classical computer system comprising a classical computer and a quantum computer,
the classical computer including a processor, a non-transitory computer readable medium, and computer instructions stored in the non-transitory computer readable medium;
the quantum computer including a quantum component, having a plurality of qubits, which accepts a sequence of instructions to evolve a quantum state based on a series of quantum gates;
wherein the computer instructions, when executed by the processor, perform a method, the method comprising:
defining the combinatorial optimization problem to be solved, the combinatorial optimization problem having a domain F of feasible solutions;
using a classical optimization algorithm on the classical computer as a pre-processor, selecting a seed approximate solution belonging to the domain F;
evolving, based on the seed approximate solution, a quantum state in a quantum circuit on the quantum computer;
generating an undirected graph to connect the feasible solutions to the combinatorial optimization problem;
using continuous-time quantum walk (CTQW), searching a neighborhood of the seed approximate solution, thereby finding a superposition of the feasible solutions to the combinatorial optimization problem;
using an iterative optimizer, tuning parameters of the quantum circuit, thereby producing optimal parameters of the quantum circuit, comprising:
running the quantum circuit with the parameters of the quantum circuit;
measuring the final state of the quantum circuit in the computational basis; and tuning the parameters of the quantum circuit to maximize a probability of obtaining feasible solutions having a cost function minimum, thereby obtaining the enhanced problem solution with a lower cost function value than the approximate solution seed.

16. The hybrid quantum-classical computer system of claim 15, wherein the enhanced problem solution is more precise than the seed approximate solution received from the classical optimization algorithm.

17. The hybrid quantum-classical computer system of claim 15, wherein selecting the seed approximate solution comprises generating the seed approximate solution by a variational quantum algorithm.

18. The hybrid quantum-classical computer system of claim 15, wherein selecting the seed approximate solution comprises selecting the seed approximate solution such that the iterative optimizer tunes the parameters of the quantum circuit in polynomial time.

19. The hybrid quantum-classical computer system of claim 15, wherein the classical optimization algorithm selects the seed approximate solution using simulated annealing.

20. The hybrid quantum-classical computer system of claim 15, wherein the classical optimization algorithm selects the seed approximate solution using semi-definite programming.

21. The hybrid quantum-classical computer system of claim 15, wherein the classical optimization algorithm selects the seed approximate solution using spectral graph theory.

22. The hybrid quantum-classical computer system of claim 15, wherein the combinatorial optimization problem comprises a Max Bisection problem.

23. The hybrid quantum-classical computer system of claim 15, wherein the combinatorial optimization problem comprises a Max Independent Set problem.

24. The hybrid quantum-classical computer system of claim 15, wherein the combinatorial optimization problem comprises a Max 3 SAT problem.

25. The hybrid quantum-classical computer system of claim 15, wherein the combinatorial optimization problem comprises a Portfolio Optimization problem.

26. The hybrid quantum-classical computer system of claim 15, wherein the combinatorial optimization problem comprises a Traveling Salesperson problem.

27. The hybrid quantum-classical computer system of claim 15, wherein the combinatorial optimization problem comprises a constrained problem without modifying its cost function.

28. The hybrid quantum-classical computer system of claim 15, wherein tuning the parameters of the quantum circuit comprises tuning the parameters of the quantum circuit without indexing the feasible solutions.

* * * * *